United States Patent
Chen et al.

(10) Patent No.: US 11,674,579 B2
(45) Date of Patent: Jun. 13, 2023

(54) PLANETARY GEAR TRAIN AUTOMATIC LIMITED SLIP DIFFERENTIAL

(71) Applicant: Hubei University of Automotive Technology, Shiyan (CN)

(72) Inventors: Yurong Chen, Shiyan (CN); Shenghuai Wang, Shiyan (CN); Aihong Gong, Shiyan (CN); Zhen Wang, Shiyan (CN); Xueliang Zhou, Shiyan (CN); Wen Cheng, Shiyan (CN); Aihua Ren, Shiyan (CN); Zhangdong Sun, Shiyan (CN); Hongxia Wang, Shiyan (CN); Weidong Yan, Shiyan (CN); Qiang Liu, Shiyan (CN); Guoxing Sun, Shiyan (CN); Chunlong Zou, Shiyan (CN); Junjie Liu, Shiyan (CN); Tao Chen, Shiyan (CN); Shuo Cheng, Shiyan (CN); Yu Wang, Shiyan (CN); Wenlong Jia, Shiyan (CN); Suiyu Yin, Shiyan (CN); Longyong Gan, Shiyan (CN); Rengan Wei, Shiyan (CN)

(73) Assignee: Hubei University of Automotive Technology, Shiyan (CN)

( * ) Notice: Subject to any disclaimer, the term of this patent is extended or adjusted under 35 U.S.C. 154(b) by 0 days.

(21) Appl. No.: 18/046,336

(22) Filed: Oct. 13, 2022

(65) Prior Publication Data
US 2023/0124568 A1 Apr. 20, 2023

(30) Foreign Application Priority Data
Oct. 14, 2021 (CN) .......................... 202111195933.7

(51) Int. Cl.
*F16H 48/20* (2012.01)
*F16H 48/24* (2006.01)
(Continued)

(52) U.S. Cl.
CPC ............. *F16H 48/24* (2013.01); *F16H 48/06* (2013.01); *F16H 57/082* (2013.01); *F16H 48/20* (2013.01); *F16H 2048/204* (2013.01)

(58) Field of Classification Search
CPC ........ F16H 48/24; F16H 48/06; F16H 57/082; F16H 2048/204; F16H 2048/202; F16H 37/082; F16H 48/20
(Continued)

(56) References Cited

U.S. PATENT DOCUMENTS 1,377,380 A * 5/1921 Woodward ............. B60K 17/20
475/231
1,632,787 A * 6/1927 Crawford ................ F16H 48/16
475/231
(Continued)

FOREIGN PATENT DOCUMENTS

| CN | 1587754 A | 3/2005 |
| CN | 104964020 A | 10/2015 |
| CN | 211145273 U | 7/2020 |

*Primary Examiner* — Sherry L Estremsky
(74) *Attorney, Agent, or Firm* — Capitol City TechLaw

(57) ABSTRACT

A planetary gear train automatic limited slip differential may consist of a main differential, a planetary gear train differential controller, a left axle shaft, a right axle shaft, and a clutch. The planetary gear train differential controller may be composed of a first planetary gear train differential controller unit and a second planetary gear train differential controller unit. The first planetary gear train differential controller unit may be composed of a first planetary gear train and a first overrunning clutch connected to the first planetary gear train. The second planetary gear train differential controller unit may be composed of a second planetary gear train and a second overrunning clutch connected to the second planetary gear train.

2 Claims, 35 Drawing Sheets

(51) Int. Cl.
*F16H 57/08* (2006.01)
*F16H 48/06* (2006.01)

(58) Field of Classification Search
USPC .......................................................... 475/221
See application file for complete search history.

(56) References Cited

U.S. PATENT DOCUMENTS

| | | | |
|---|---|---|---|
| 8,403,796 B2 * | 3/2013 | Kato | F16H 48/36 |
| | | | 475/221 |
| 10,030,755 B2 * | 7/2018 | Severinsson | B60K 6/52 |

* cited by examiner

PLANETARY GEAR TRAIN AUTOMATIC LIMITED SLIP DIFFERENTIAL

CROSS-REFERENCE TO RELATED APPLICATION

This patent application claims the benefit and priority of Chinese Patent Application No. 202111195933.7, filed with the China National Intellectual Property Administration on Oct. 14, 2021, the disclosure of which is incorporated by reference herein in its entirety as part of the present application.

TECHNICAL FIELD

The present disclosure relates to a pure mechanical planetary gear train automatic limited slip differential, which enables a vehicle to have not only the capacity of running at a normal differential speed on the good pavement, but also the capacity of mechanically and automatically controlling limited slip, enabling a drive torque to reach the maximum value at full time and running at the normal differential speed under all-terrain, muddy, slippery and ice snow covered pavements and other and extremely severe all-weather working conditions. Such differential is applicable to all vehicles requiring differential drive.

BACKGROUND

Common symmetrical bevel planetary gear differential for automobiles consists of planetary gears, a planet carrier, a differential housing, axle shaft gears and other parts. The power of engine is input to the differential via a drive shaft to directly drive the planet carrier, and then the planetary gears drive the left and right axle shaft gears to respectively drive the left and right wheels. The design requirements for the differential should satisfy that: (the rotational speed $n_1$ of the left axle shaft)+(the rotational speed $n_2$ of the right axle shaft)=(twice rotational speed $2n_0$ of the planet carrier). When the automobile goes straight, the left and right wheels and the planet carrier have the same rotational speed and are in a balanced state, and the driving force reaches the maximum value at the moment. When the automobile turns, the rotational speed of the inner wheel is reduced while the rotational speed of the outer wheel is increased, such that the automobile runs at a normal differential speed. However, when the automobile runs on muddy, ice snow covered pavements, the change of the rotational speeds of the wheels on the two sides may exceed the range of the normal differential speed, or a more extreme condition occurs, that is, when the driving wheel on one side spins due to slipping, the rotational speed of the other driving wheel is zero, thus the driving force is zero, and the automobile stops advancing. Therefore, the maximum working efficiency and the maximum running passing performance may be kept only by working under a good environment condition.

At present, although self-locking type differentials have good automatic anti-skid capacity, both mechanical and electronic differential anti-skid technologies generally employ a high friction torque control mode, such control mode has friction heating effect, limited torque control force and poor adaptability for all-terrain work and all-weather use environment, cannot be applied to large-torque vehicles, and is mostly limited to small vehicles. Secondly, for the electronically controlled anti-skid differential system, the defects of poor adaptability and reliability in severe environments such as high cold, high heat, high salt humidity and electromagnetic interference, and high cost exist.

SUMMARY

To solve the problems in the prior art, the present disclosure provides a planetary gear train automatic limited slip differential, which employ a pure mechanical structure and has the functions of automatically controlling the maximum rotational speed difference between the left and right wheels at full time and preventing the wheels from slipping, such that the driving torques of a left driving wheel and a right driving wheel may reach the maximum value under all-terrain and all-weather working conditions, and the function of steering at the normal differential speed is ensured. In a case that the vehicle runs on the soft soil or sand, muddy, ice snow covered pavements, even the wheel on the single side is suspended and has no adhesion in the running process, the vehicle still be automatically and stably prevented from slipping in time without any manual intervention, and the normal running and passing of the vehicle are achieved.

To achieve the objective, the present disclosure employs the following technical solution: a planetary gear train automatic limited slip differential consists of a main differential, a planetary gear train differential controller, a left axle shaft, a right axle shaft, and a clutch.

The main differential is composed of a differential housing, a pin shaft, a planetary gear, a left axle shaft gear, and a right axle shaft gear. The differential housing is connected to a driven wheel of a final drive by a bolt.

The planetary gear train differential controller is composed of a first planetary gear train differential controller unit and a second planetary gear train differential controller unit. The first planetary gear train differential controller unit is composed of a first planetary gear train and a first overrunning clutch connected to the first planetary gear train. The second planetary gear train differential controller unit is composed of a second planetary gear train and a second overrunning clutch connected to the second planetary gear train. The planetary gear train differential controller is arranged at the right axle shaft at the right side of the main differential. The clutch is composed of a left clutch and a right clutch, and the left clutch and the right clutch are coupled together by jaws or disengaged from each other. An inner ring of each the first overrunning clutch and the second overrunning clutch and the left clutch are connected into a whole by splines, and the right clutch and the right axle shaft are connected together by a spline. Through the above planetary gear train automatic limited slip differential, the first planetary gear train differential controller unit is configured to control a rotational speed of a right wheel to be not lower than a set minimum rotational speed $n_{min}$, and the second planetary gear train differential controller unit is configured to control a rotational speed of the right wheel to be not higher than a set maximum rotation speed $n_{max}$.

Further, the first planetary gear train comprises a first support, a first large sun gear, a first planetary gear, a first small sun gear, and a first planet carrier. The second planetary gear train comprises a second support, a second large sun gear, a second planetary gear, a second small sun gear, and a second planet carrier.

Further, the first large sun gear of the first planetary gear train and the first support are connected together by a bolt, the first support is connected to the differential housing by a bolt. The first small sun gear is fixed to an axle housing by a bolt. The first planet carrier of the first planetary gear train and the second planet carrier of the second planetary gear are connected into a whole by a spline hollow shaft, the second planet carrier and an outer ring of the first overrunning clutch are connected into a whole by a bolt, and the rotational speed is $n_{min}$. The inner ring of the first overrunning clutch and the left clutch are connected together by a spline, the right clutch and the right axle shaft are connected together by a spline, and when a vehicle moves forward, the clutch is in a normally connected state, the rotational speed of the inner ring of the first overrunning clutch and the rotational speeds of the right axle shaft and the wheels are $n_2$, and when the rotational speed $n_2$ is greater than the rotational speed $n_{min}$ of the outer ring of the first overrunning clutch, the first overrunning clutch is in an overrunning state, and the inner ring and the outer ring do not affect each other. When the rotational speed $n_2$ is less than or equal to the rotational speed $n_{min}$ of the outer ring, the first overrunning clutch is in a wedging state, the inner ring and the outer ring of the first overrunning clutch rotate together at the rotational speed of $n_{min}$, and therefore the purpose that the rotational speed $n_2$ is limited to be not lower than the rotational speed $n_{min}$ is achieved.

Further, the second small sun gear of the second planetary gear train is fixed to the axle housing by a bolt, the second planet carrier of the second planetary gear train and the first planet carrier of the first planetary gear train are connected into a whole, the second large sun gear and the second support are connected together by a bolt, and the second support and an outer ring of the second overrunning clutch are connected into a whole by a bolt, and the rotational speed is $n_{max}$. The inner ring of the second overrunning clutch and the left clutch are connected together by a spline. When the vehicle moves forward, the clutch is in a normally connected state, the rotational speed of the inner ring of the second overrunning clutch and the rotational speeds of the right axle shaft and the wheels are $n_2$, and when the rotational speed $n_2$ is greater than the rotational speed $n_{max}$ of the outer ring of the second overrunning clutch, the second overrunning clutch is in an overrunning state, and the inner ring and the outer ring do not affect each other. When the rotational speed $n_2$ is greater than or equal to the rotational speed $n_{max}$ of the outer ring, the second overrunning clutch is in a wedging state, the inner ring and the outer ring of the second overrunning clutch rotate together at the rotational speed of $n_{max}$, and therefore the purpose that the rotational speed $n_2$ is limited to be not greater than the rotational speed $n_{max}$ is achieved.

In accordance with the present disclosure, in a case of a normal differential speed, the first overrunning clutch and the second overrunning clutch are both in an overrunning state. In a case of an abnormal differential speed state, that is, when the wheel slip occurs, one overrunning clutch is in a wedging state and the other is in an overrunning state, without interfering with each other. In this way, by means of the two planetary gear train differential controller units, the rotational speed of the left wheel and the rotational speed of the right wheel are limited within a designed allowable differential speed range from $n_{min}$ to $n_{max}$, and therefore the differential not only can meet the maximum differential speed requirement during turning, but also can achieve the purpose of automatic limited slip when the vehicle slips.

In accordance with the present disclosure, when the vehicle in reverse, the clutch disengages, and the planetary gear train differential controller does not work.

The present disclosure has the beneficial effects that the main differential is the same as an existing bevel gear differential. The key core technology is that a set of planetary gear train differential controller is additionally provided. The control mechanism has the function of automatically controlling the maximum rotational speed difference between the left and right wheels at full time in a case of guaranteeing the function of turning at the normal differential speed, such that the driving torques of a left driving wheel and a right driving wheel may reach the maximum value under all-terrain and all-weather working conditions. In a case that the vehicle runs on the soft soil or sand, muddy and slippery ice snow covered pavements, and even the wheel on the single side is suspended and has no adhesion in the running process, the vehicle is automatically and stably guaranteed to run and pass through normally and efficiently without slipping. The control mechanism not only can be used for driving an axle differential, but also can be used for steering the axle differential and a center differential. The full-time all-wheel drive function of the vehicle is achieved by means of a pure mechanical structure, and the features of high trafficability, large torque, high reliability, low cost and the like are achieved. The system is completely compatible with other safety control systems, such as an ABS (Anti-lock Braking System), a TCS (Traction Control System) and a SCS, of the vehicle, is mutually independent and does not affect another, and has a wide market application prospect.

DETAILED DESCRIPTION OF THE EMBODIMENTS

Figure 1:
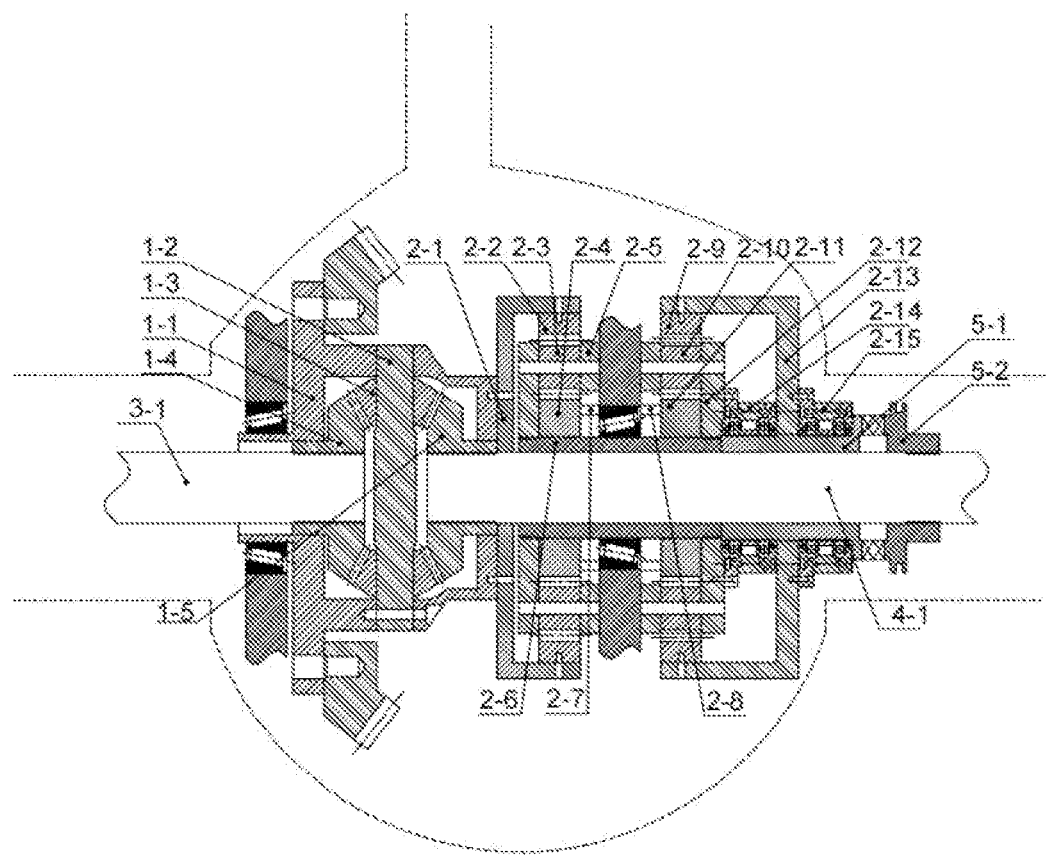
FIG. 1 is a schematic diagram of the structure of a planetary gear train automatic limited slip differential in accordance with the present disclosure.

The following further describes the embodiments of the present disclosure with reference to the accompanying drawings.

As shown in FIG. 1 to FIG. 37, where FIG. 4 to FIG. 10 are reference diagrams of physical models of main parts in accordance with the present disclosure. A planetary gear train automatic limited slip differential provided by the present disclosure is composed of five parts: a main differential, a planetary gear train differential controller, a left axle shaft 3-1, a right axle shaft 4-1, and a clutch, and is suitable for various sizes of wheeled vehicles equipped with differentials.

The main differential 1 and a symmetric bevel gear differential in the prior art in have the same principle but different structures. The main differential is mainly composed of a differential housing 1-1 connected to a driving bevel gear and a driven bevel gear, a pin shaft 1-2, a planetary gear 1-3, a left axle shaft gear 1-4, a right axle shaft gear 1-5 and other parts, the differential housing 1-1 and the pin shaft 1-2 are connected together by a bolt, the planetary gear 1-3 is installed on the pin shaft 1-2, and the planetary gear 1-3 is symmetrically and normally meshed with the left axle shaft gear 1-4 and the right axle shaft gear 1-5. Inner splines are arranged at the inner holes of the left axle shaft gear 1-4 and the right axle shaft gear 1-5, and a respectively connected to outer splines of the left axle shaft 3-1 and the right axle shaft 4-1.

The planetary gear train differential controller is arranged at the right side of the main differential. On the right axle shaft, the planetary gear train differential controller is composed of two planetary gear train differential controller units which are defined as a first planetary gear train differential controller unit and a second planetary gear train differential controller unit. The first planetary gear train differential controller unit is composed of a first planetary gear train and a first overrunning clutch connected to the first planetary gear train; and the second planetary gear train differential controller unit is composed of a second planetary gear train and a second overrunning clutch connected to the second planetary gear train.

The first planetary gear train comprises a first support 2-1, a first large sun gear 2-2, a first planetary gear 2-3, a first small sun gear 2-4, and a first planet carrier 2-5. The second planetary gear train comprises a second support 2-13, a second large sun gear 2-9, a second planetary gear 2-10, a second small sun gear 2-11, and a second planet carrier 2-12.

The first support 2-1 and the main differential housing 1-1 are connected together by a bolt, the first large sun gear 2-2 is fixed to the first support 2-1 by a bolt, and the first small sun gear 2-4 is fixed to an axle housing by a bolt 2-7. The first planet carrier 2-5 and the second planet carrier 2-12 are connected into a whole by a spline hollow shaft 2-6, the second planet carrier 2-12 and an outer ring of the first overrunning clutch 2-14 are connected into a whole by a bolt, and the rotational speed is $n_{min}$. An inner ring of the first overrunning clutch 2-14 and a left clutch 5-1 are connected together by a spline, and a right clutch 5-2 and the right axle shaft 4 are connected together by a spline. When the clutch is in a connected state, the rotational speed of the inner ring of the first overrunning clutch 2-14 and the rotational speeds of the right axle shaft 4 and the wheel are $n_2$, at the moment, when the rotational speed $n_2$ of the inner ring of the first overrunning clutch 2-14 is greater than the rotational speed $n_{min}$ of the outer ring, the first overrunning clutch 2-14 is in an overrunning state, and the inner ring and the outer ring do not affect each other. When the rotational speed $n_2$ of the inner ring of the first overrunning clutch is less than or equal to the rotational speed $n_{min}$ of the outer ring, the first overrunning clutch 2-14 is in a wedging state, the inner ring and the outer ring of the first overrunning clutch rotate together at the rotational speed of $n_{min}$, thereby achieving the purpose of limiting the rotational speed $n_2$ to be not lower than the rotational speed $n_{min}$. The second small sun gear 2-11 is fixed to the axle housing by a bolt 2-8, the second large sun gear 2-9 and the second support 2-13 are connected together by a bolt, and the second support 2-13 an outer ring of the second overrunning clutch 2-15 are connected into a whole by a bolt, and the rotational speed is $n_{max}$. An inner ring of the second overrunning clutch 2-15 and the left clutch 5-1 are connected together by a spline, and the right clutch 5-2 and the right axle shaft 4 are connected together by a spline. When the clutch is in a connected state, the rotational speed of the inner ring of the second overrunning clutch 2-15 and the rotational speeds of the right axle shaft 4 and the wheel are $n_2$, at the moment, when the rotational speed $n_2$ of the inner ring of the second overrunning clutch 2-15 is less than the rotational speed $n_{max}$ of the outer ring, the second clutch 2-15 is in an overrunning state, and the inner ring and the outer ring do not affect each other. When the rotational speed $n_2$ of the inner ring of the second overrunning clutch 2-15 is greater than or equal to the rotational speed $n_{max}$ of the outer ring, the second overrunning clutch is in a wedging state, the inner ring and the outer ring of the second overrunning clutch rotate together at the rotational speed of $n_{max}$, thereby achieving the purpose of limiting the rotational speed $n_2$ to be not greater than the rotational speed $n_{max}$.

In accordance with the present disclosure, the rotational speeds of the left and right wheels are controlled, by the two planetary gear train differential controller units, to be limited within a designed allowable differential speed range from $n_{min}$ to $n_{max}$, thereby achieving the purpose of automatic limited slip.

In accordance with the present disclosure, when the rotational speed of the outer ring of the first overrunning clutch 2-14 is less than that of the inner ring, the first overrunning clutch is in an overrunning state, and when the rotational speed of the outer ring of the first overrunning clutch is greater than or equal to that of the inner ring, the first overrunning clutch is in a wedging state. When the rotational speed of the outer ring of the second overrunning clutch 2-15 is greater than that of the inner ring, the second overrunning clutch is in an overrunning state, and when the rotational speed of the outer ring of the second overrunning clutch is less than or equal to that of the inner ring, the second overrunning clutch is in a wedging state.

The input end 5-1 of the clutch and the output end 5-2 of the clutch are connected together by jaws, and the inner side of the output end 5-2 of the clutch is provided with a spline, such that the clutch may be slidingly sleeved outside the right axle shaft; when a vehicle is in reverse, a shift fork ring is shifted to enable the output end 5-2 of the clutch to slide along the right axle shaft 4-1, and the connected jaws of the input end 5-1 of the clutch to the output end 5-2 of the clutch are separated, such that the first overrunning clutch 2-14 and the second overrunning clutch 2-15 are disengaged from the right axle shaft to achieve normal reverse running of the vehicle.

In accordance with the present disclosure, FIG. 11 to FIG. 37 are structure diagrams (two-dimensional line plots) of main parts in accordance with the present disclosure to further express the present disclosure intuitively.

The working principle of the present disclosure is described as follows.

Figure 2:
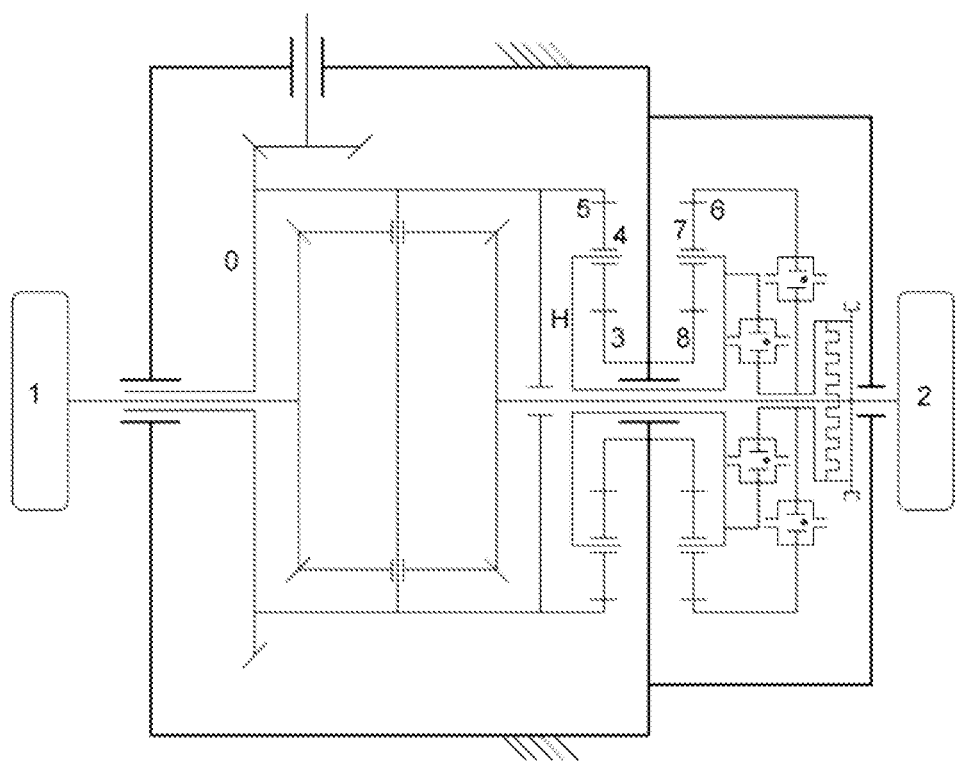
FIG. 2 is an operating schematic diagram of a planetary gear train automatic limited slip differential in accordance with the present disclosure.

The working principle of the planetary gear train automatic limited slip differential is as shown in FIG. 2. The working principle of the main differential in the present disclosure is the same as that of a conventional differential. The power of an engine is input to the main differential by means of a gearbox, and the power of the main differential is divided into two paths, one path of power is distributed to the left axle shaft and the right axle shaft by means of the planetary gear to drive the vehicle to run normally, while the other path of power is input into a planetary gear train differential controller unit by means of the differential housing 0. In a case of the normal differential speed, the planetary gear train differential controller unit spins without consuming the power, and only in a case that the wheel slip exceeds the normal differential speed range, the controller may play a role in controlling the rotational speed.

Figure 3:
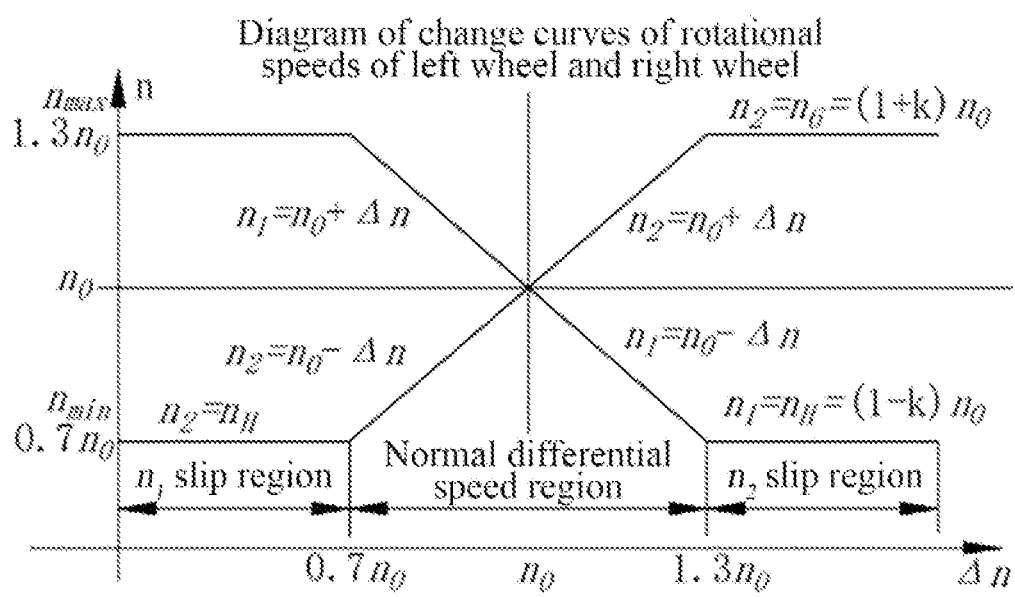
FIG. 3 is diagram of variation curves of rotational speeds of a left wheel and a right wheel controlled by a planetary gear train automatic limited slip differential in accordance with the present disclosure.
Figure 4:
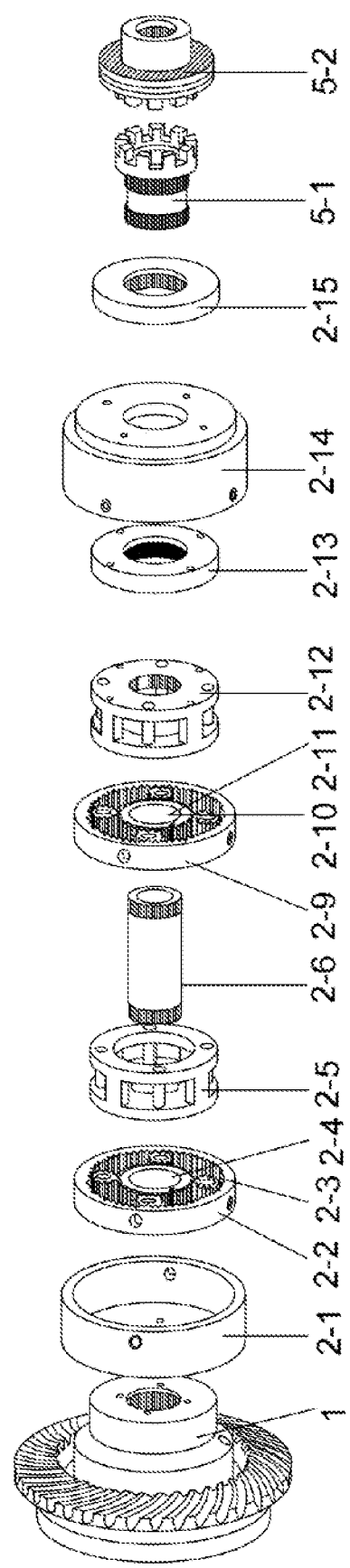
FIG. 4 is a structural diagram (physical model) of a planetary gear train automatic limited slip differential in accordance with the present disclosure.
Figure 5:
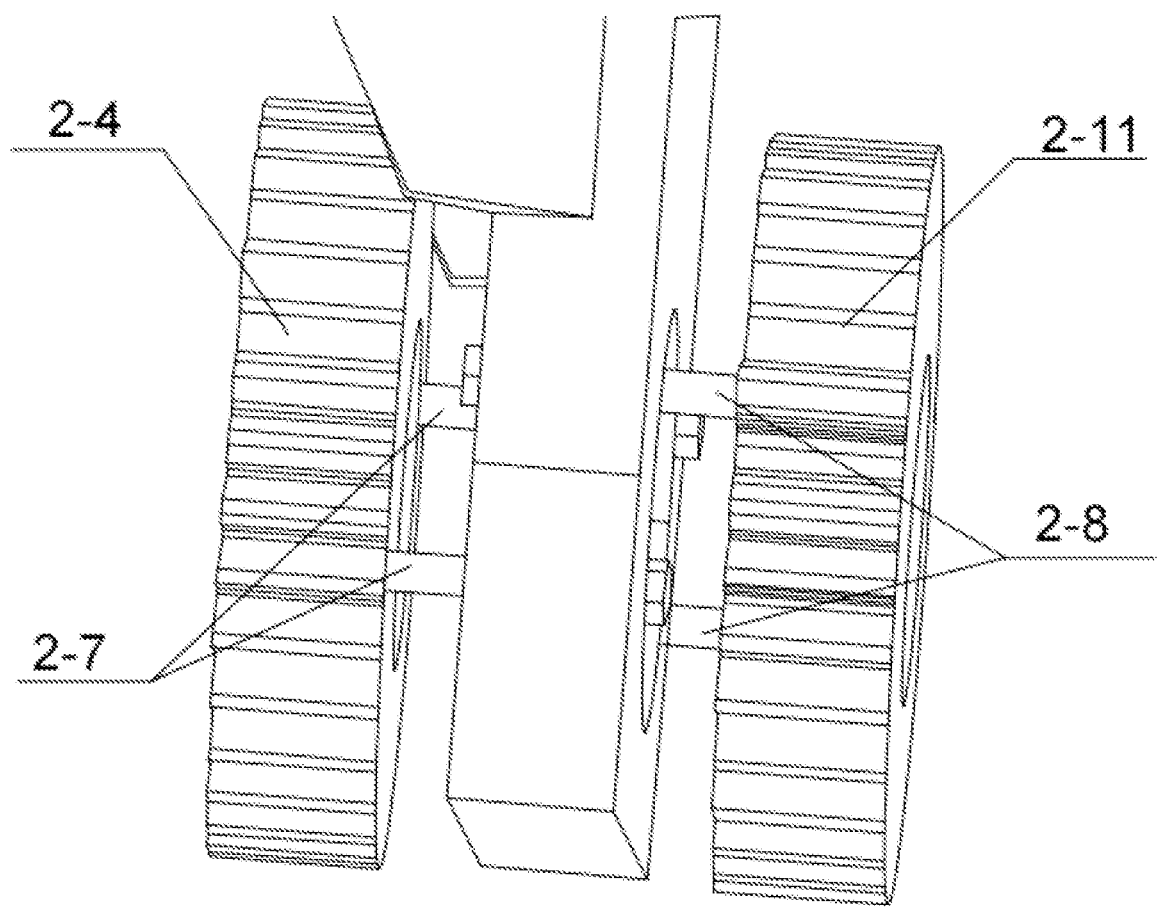
FIG. 5 is a structural diagram (physical model) of a fixing of a small sun gear of a planetary gear train in accordance with the present disclosure.
Figure 6:
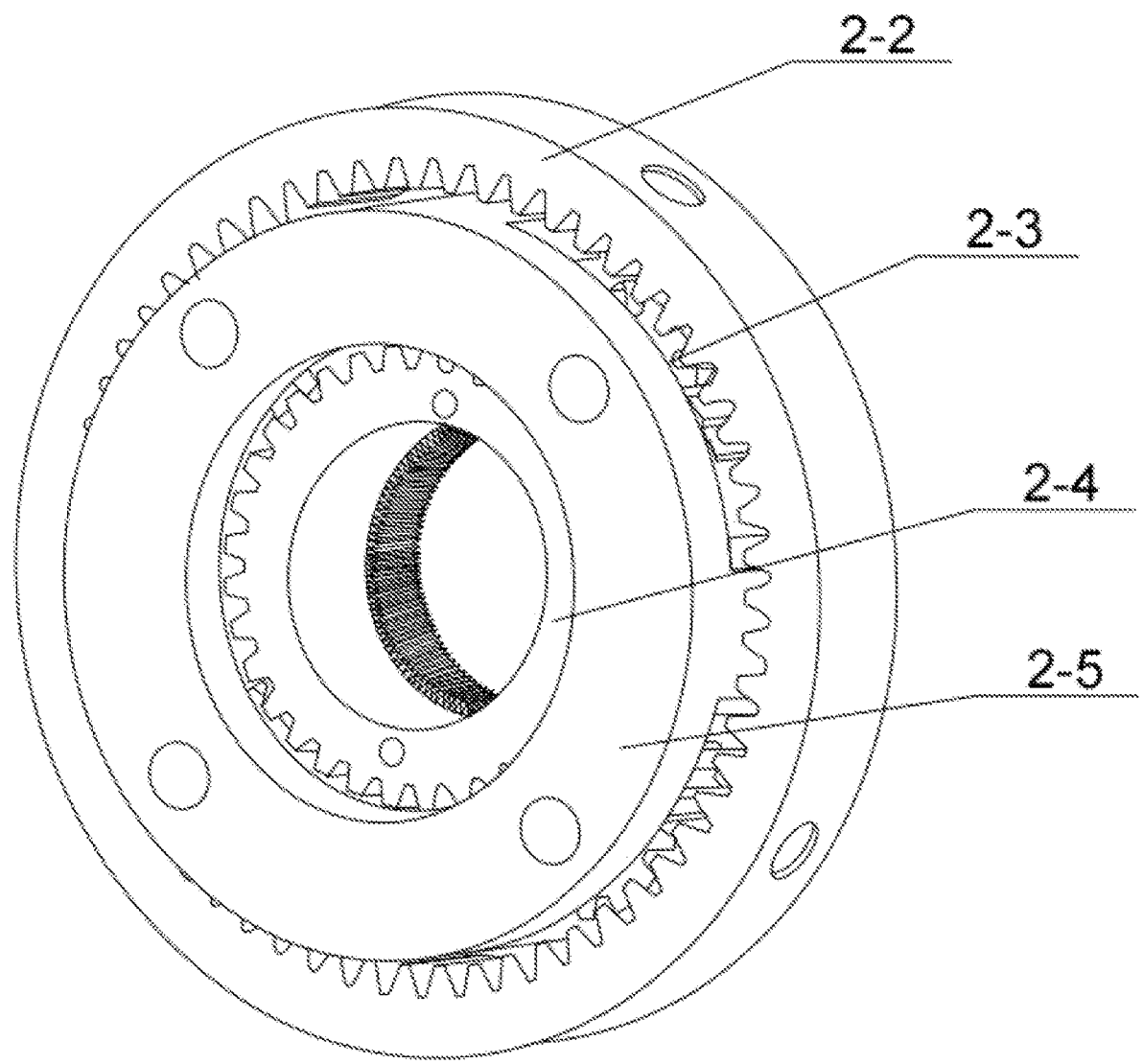
FIG. 6 is a structure diagram (physical model) of a first planetary gear train in accordance with the present disclosure.
Figure 7:
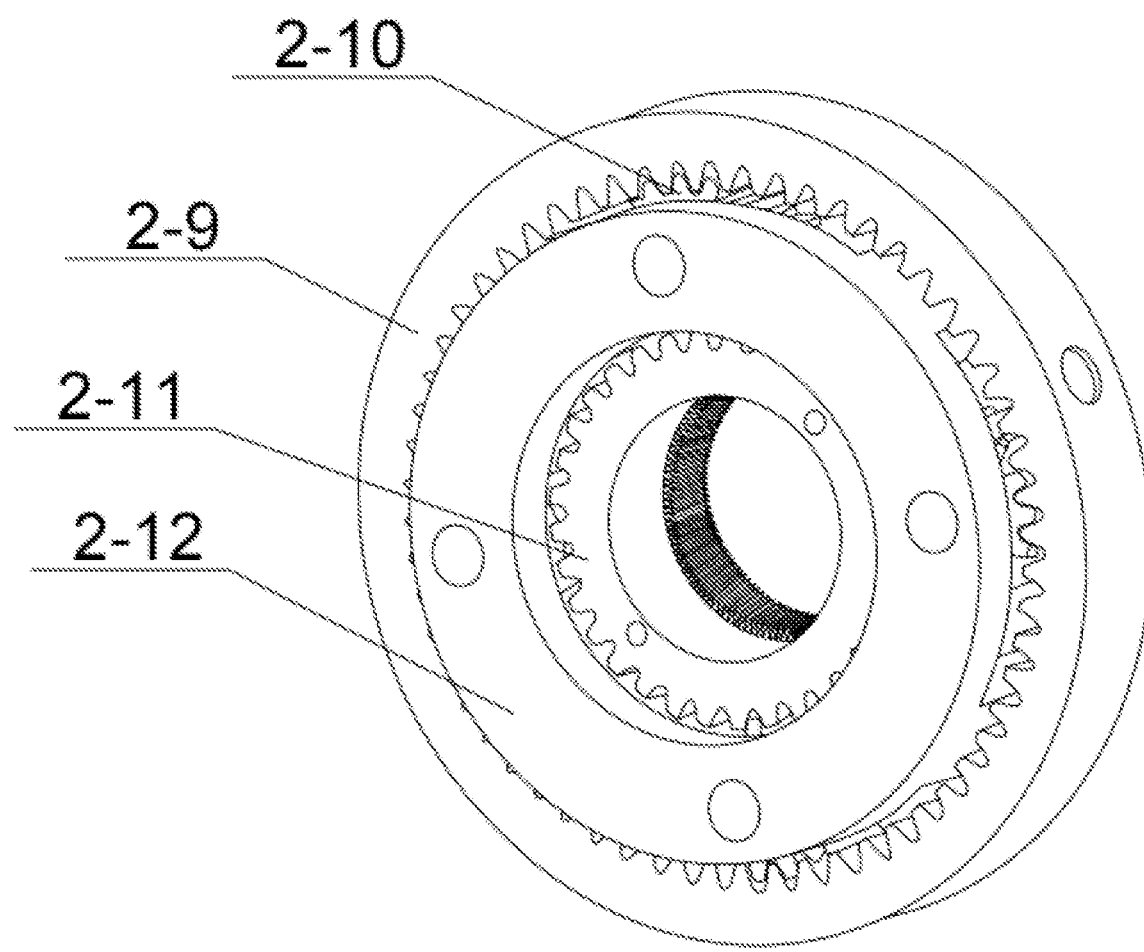
FIG. 7 is a structure diagram (physical model) of a second planetary gear train in accordance with the present disclosure.
Figure 8:
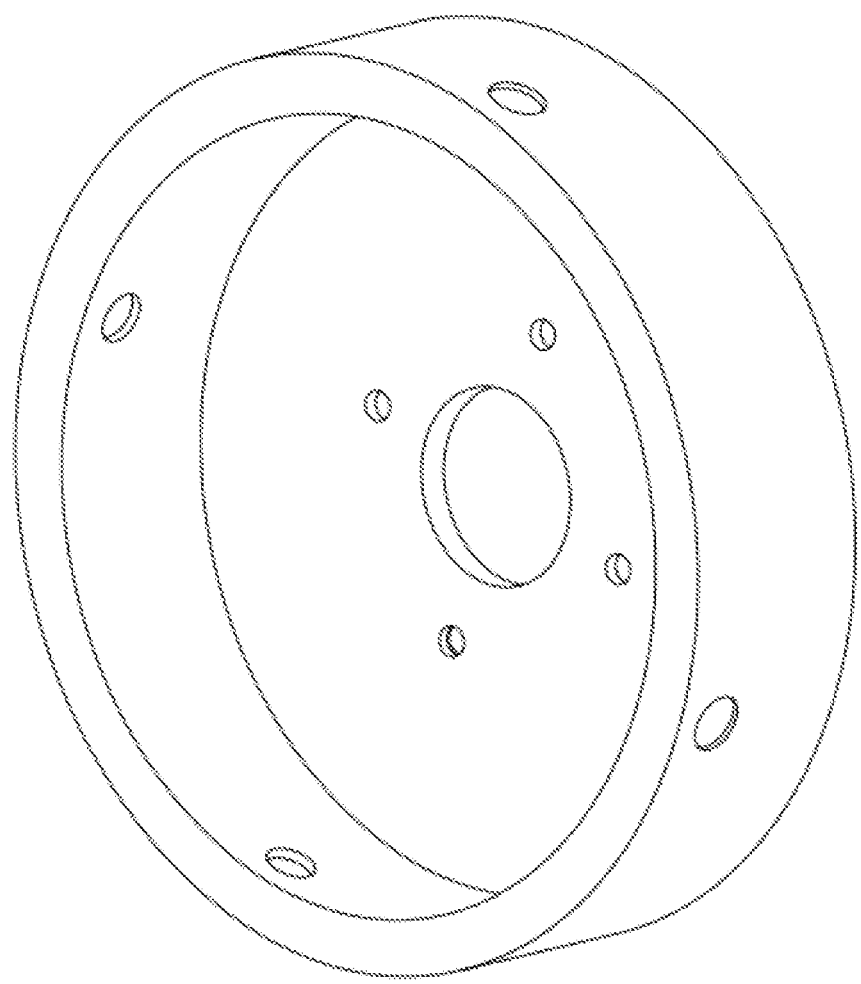
FIG. 8 is a structure diagram (physical model) of a first support in accordance with the present disclosure.
Figure 9:
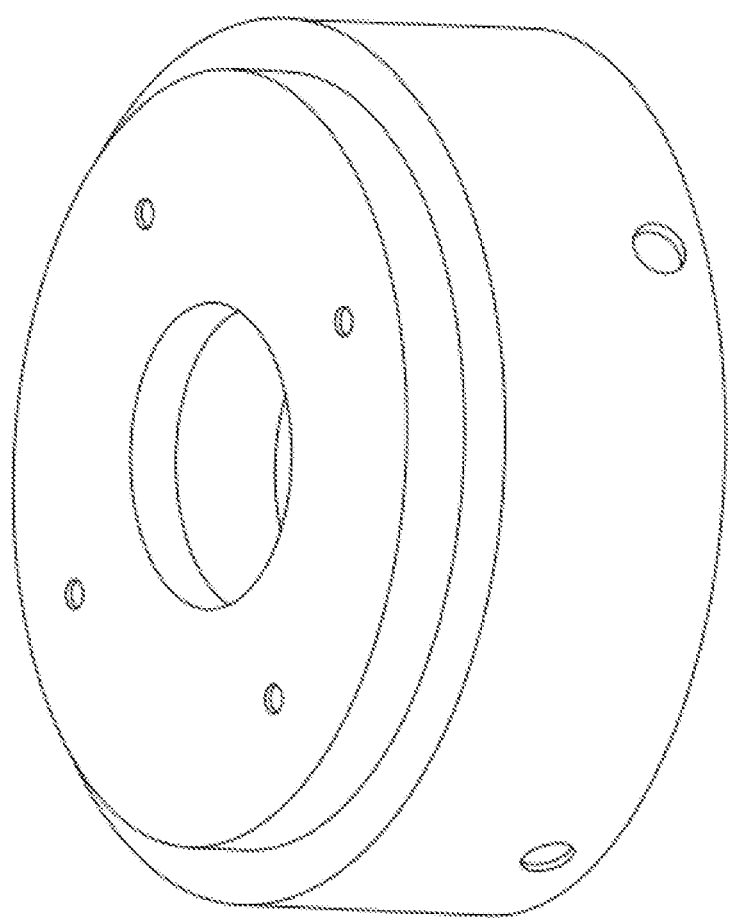
FIG. 9 is a structure diagram (physical model) of a second support in accordance with the present disclosure.
Figure 10:
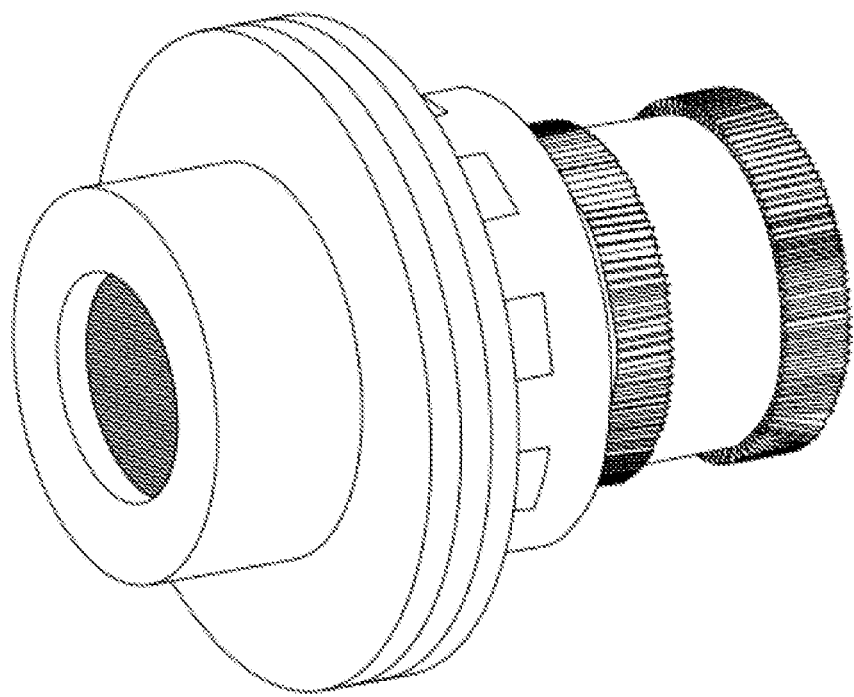
FIG. 10 is a structure diagram of a clutch in accordance with the present disclosure.
Figure 11:
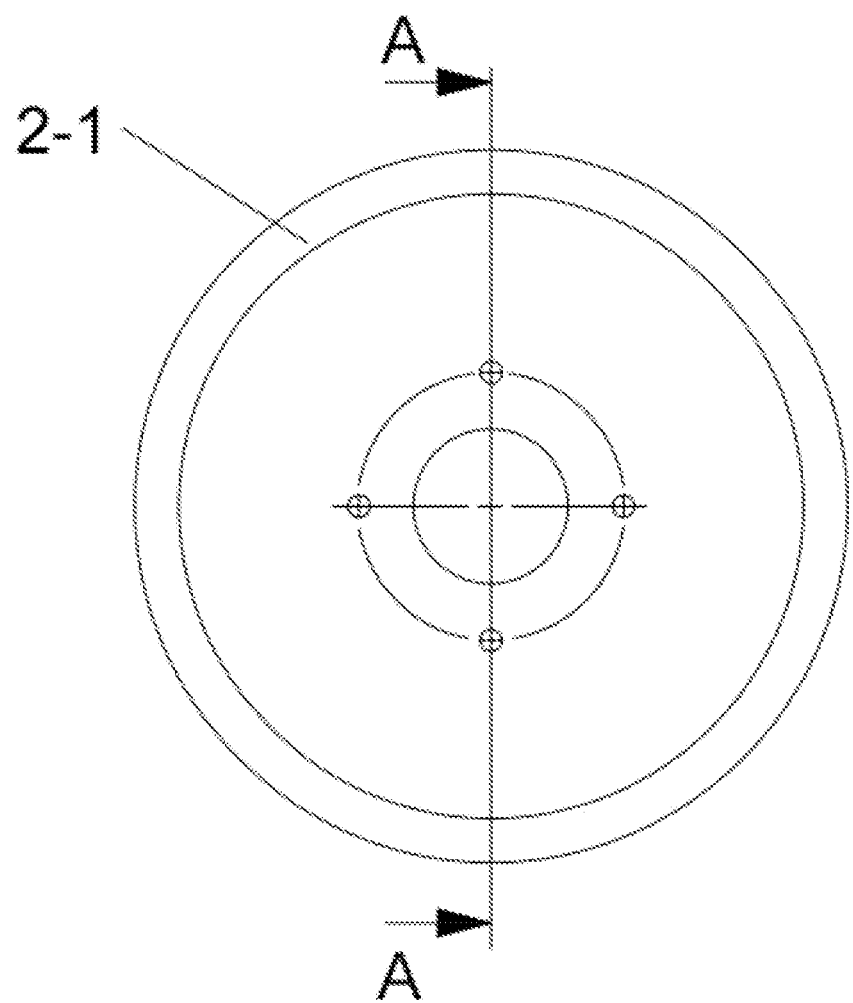
FIG. 11 is a front view of a first support in accordance with the present disclosure.
Figure 12:
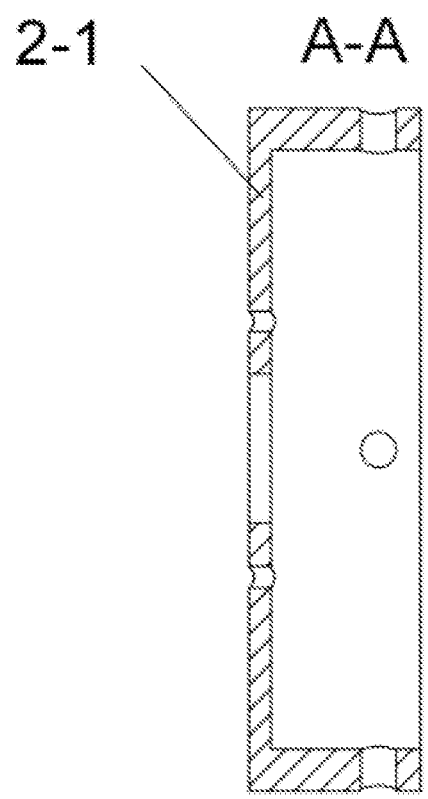
FIG. 12 is a sectional view along A-A in FIG. 11.
Figure 13:
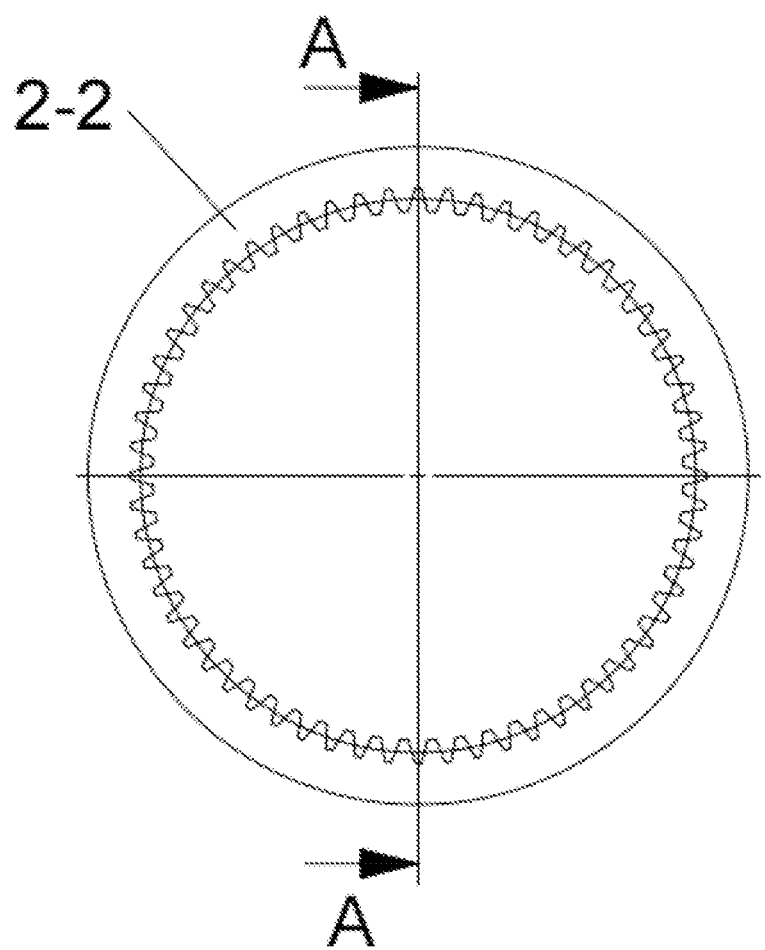
FIG. 13 is a front view of a first large sun gear in accordance with the present disclosure.
Figure 14:
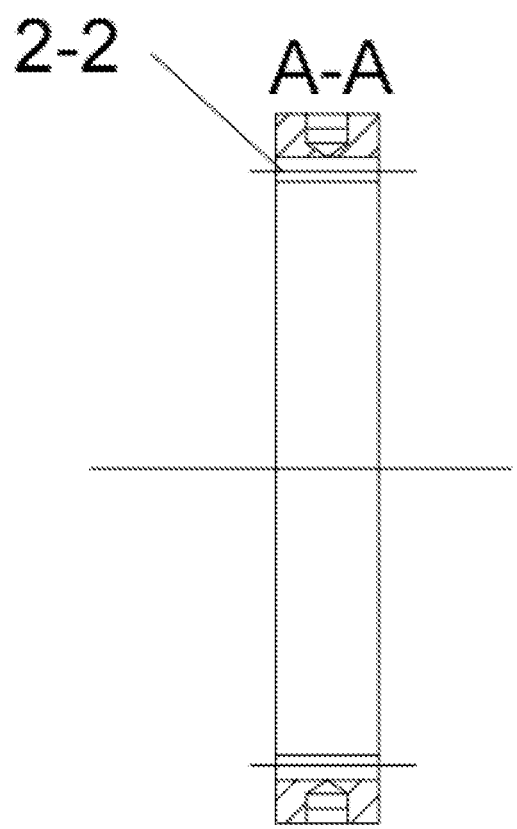
FIG. 14 is a sectional view along A-A in FIG. 13.
Figure 15:
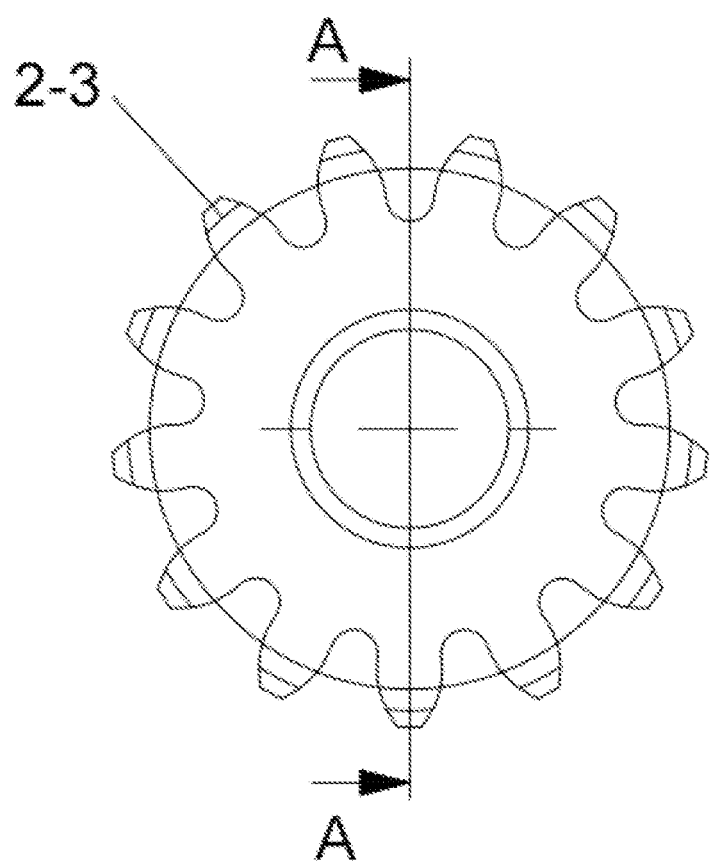
FIG. 15 is a front view of a first planetary gear in accordance with the present disclosure.
Figure 16:
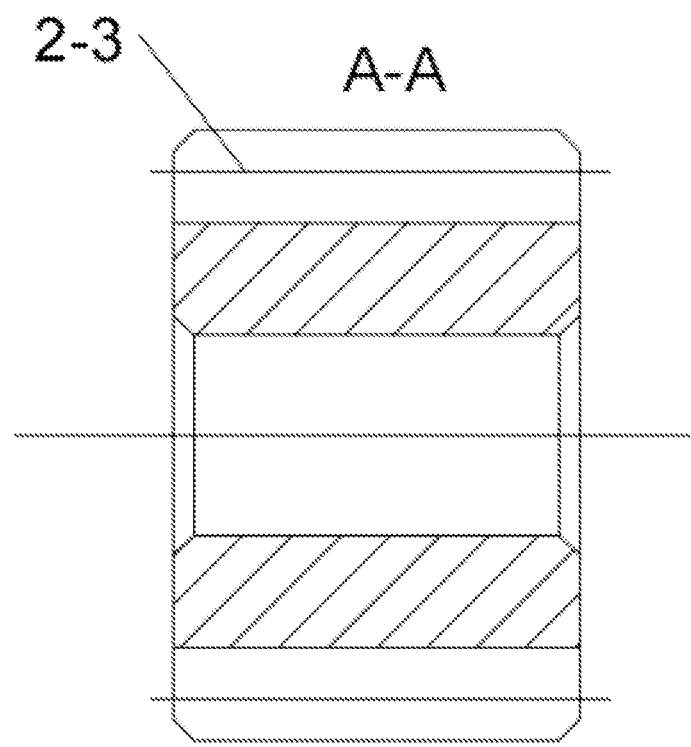
FIG. 16 is a sectional view along A-A in FIG. 15.
Figure 17:
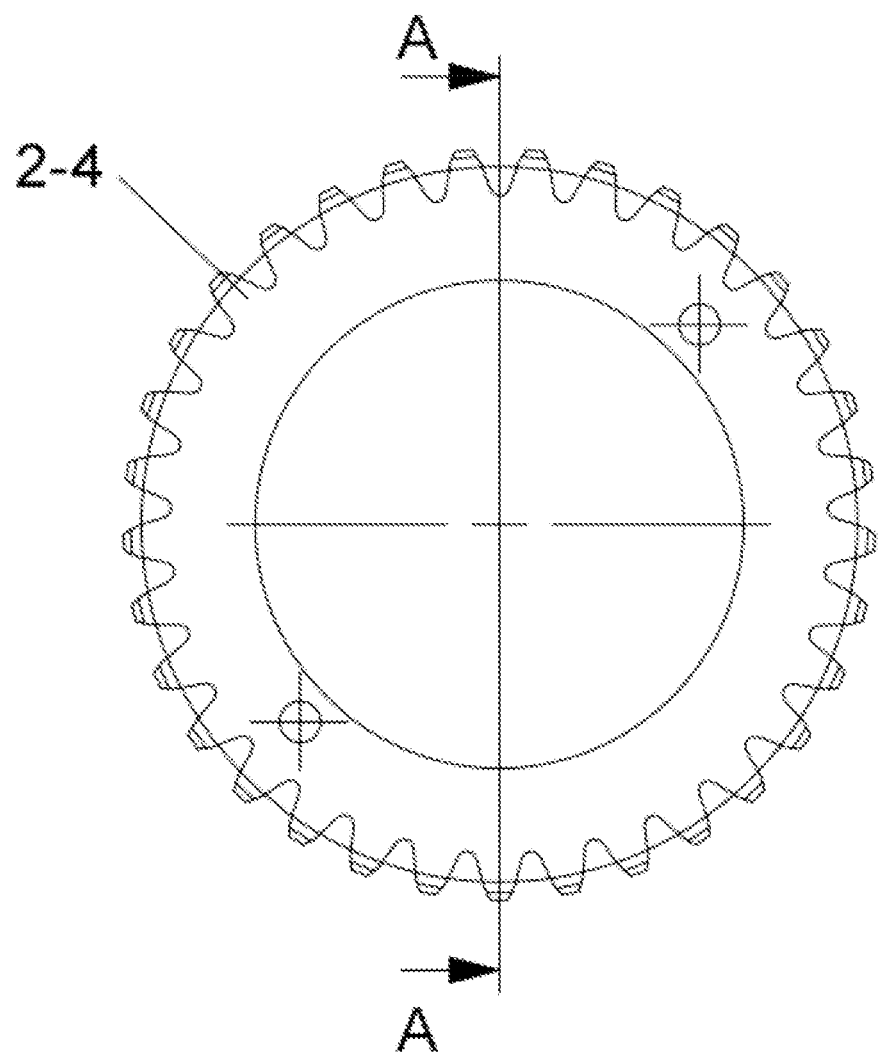
FIG. 17 is a front view of a first small sun gear in accordance with the present disclosure.
Figure 18:
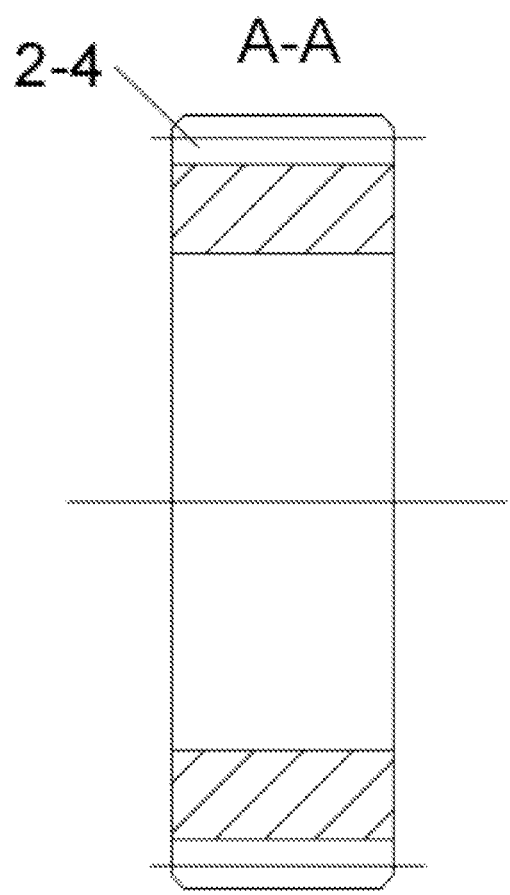
FIG. 18 is a sectional view along A-A in FIG. 17.
Figure 19:
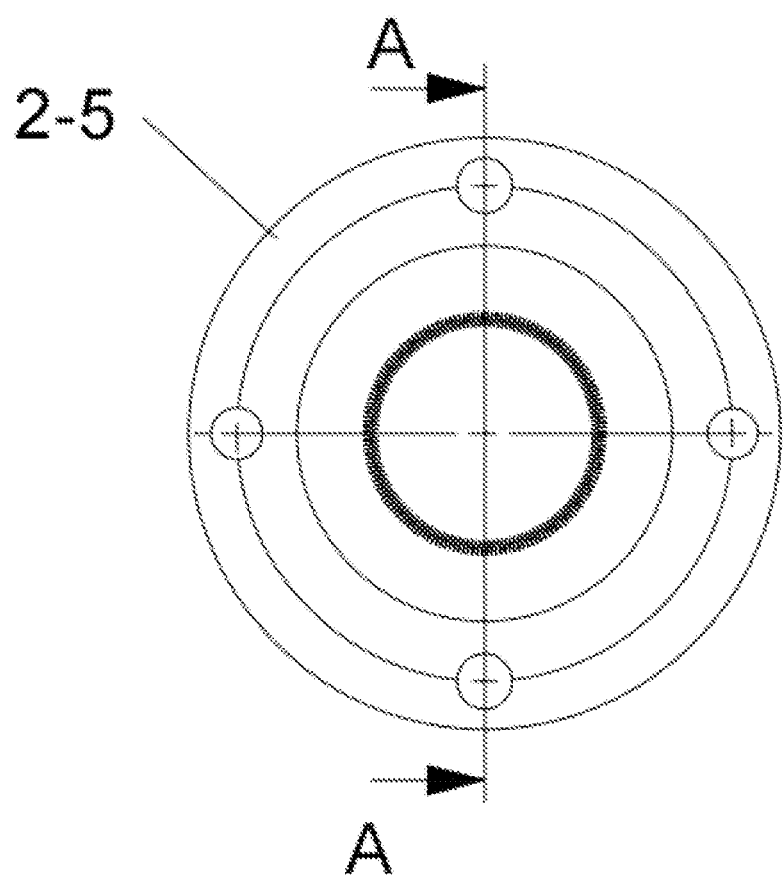
FIG. 19 is a front view of a first planet carrier in accordance with the present disclosure.
Figure 20:
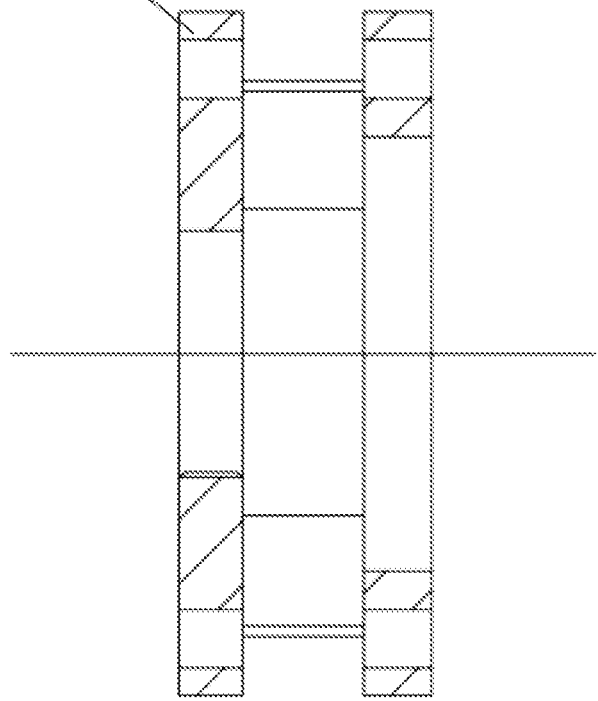
FIG. 20 is a sectional view along A-A in FIG. 19.
Figure 21:
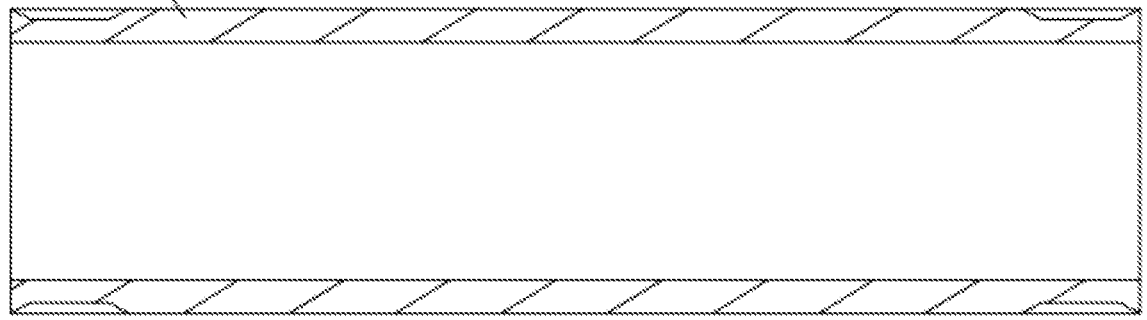
FIG. 21 is a structure diagram of a hollow spindle in accordance with the present disclosure.
Figure 22:
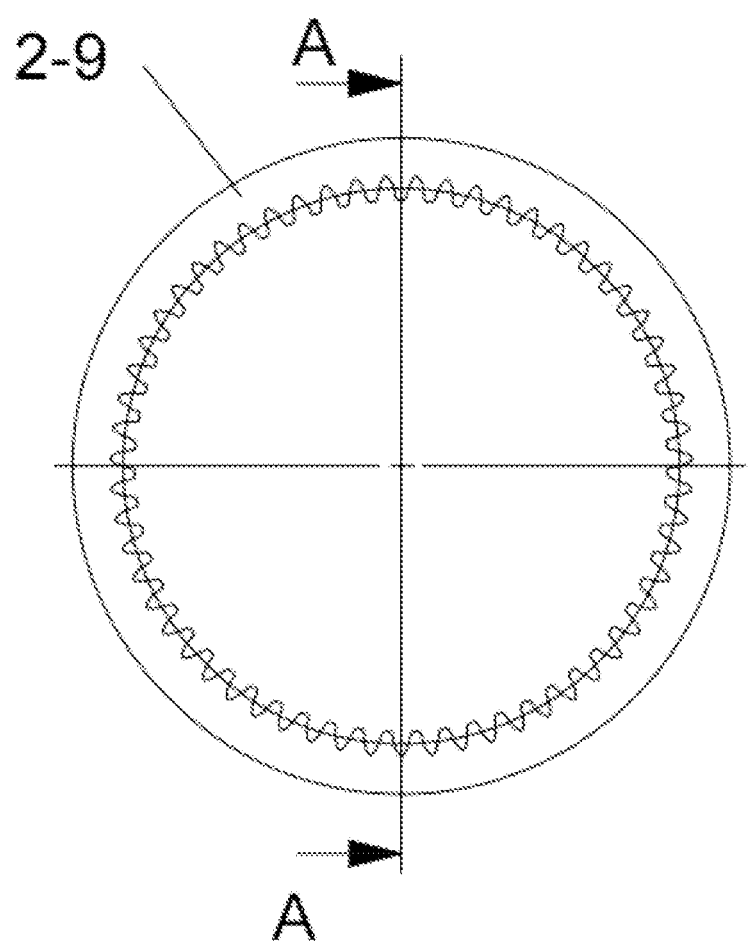
FIG. 22 is a front view of a second large sun gear in accordance with the present disclosure.
Figure 23:
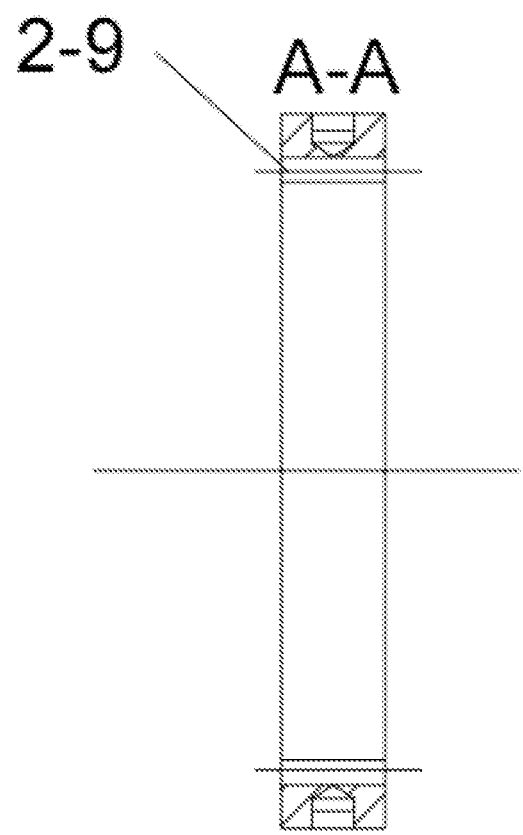
FIG. 23 is a sectional view along A-A in FIG. 22.
Figure 24:
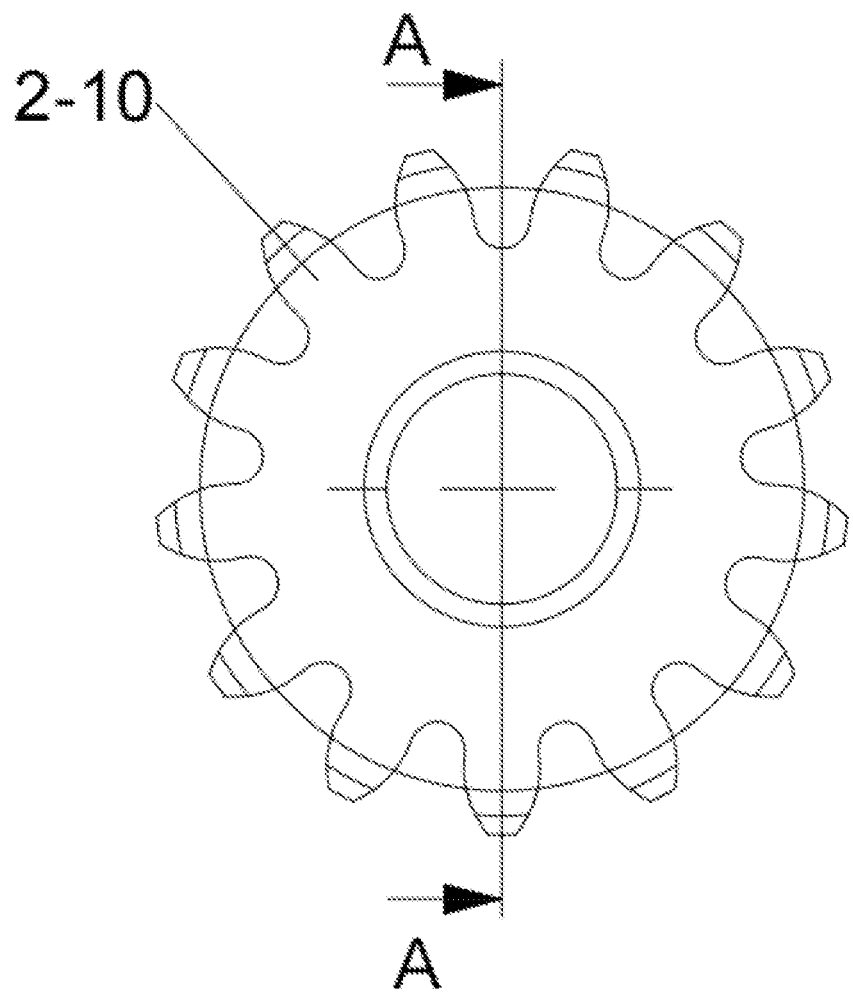
FIG. 24 is a front view of a second planetary gear in accordance with the present disclosure.
Figure 25:
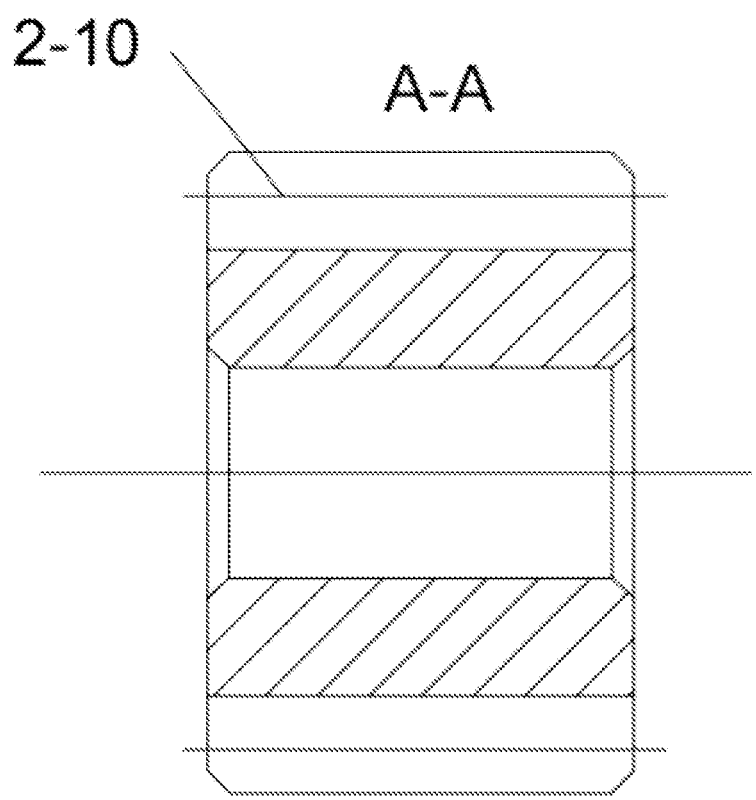
FIG. 25 is a sectional view along A-A in FIG. 24.
Figure 26:
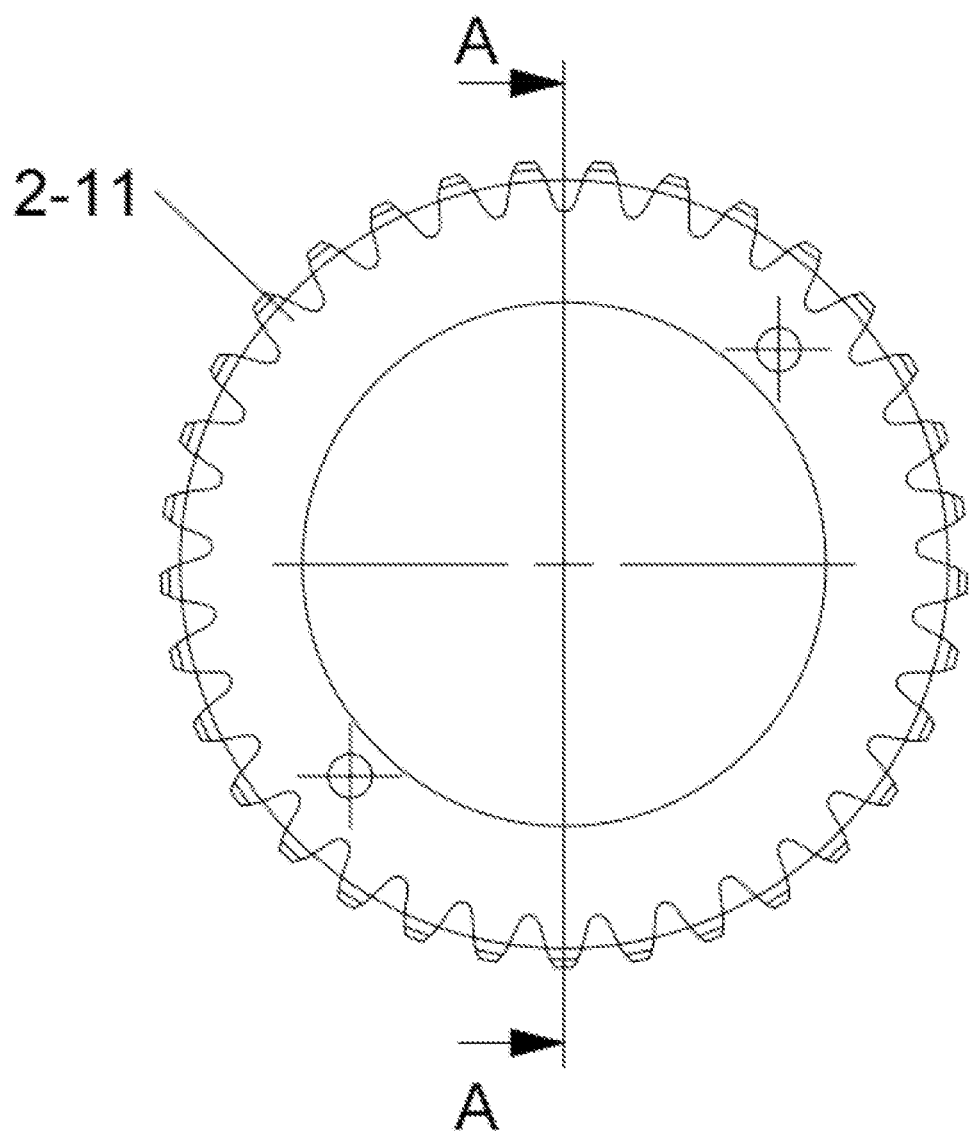
FIG. 26 is a front view of a second small sun gear in accordance with the present disclosure.
Figure 27:
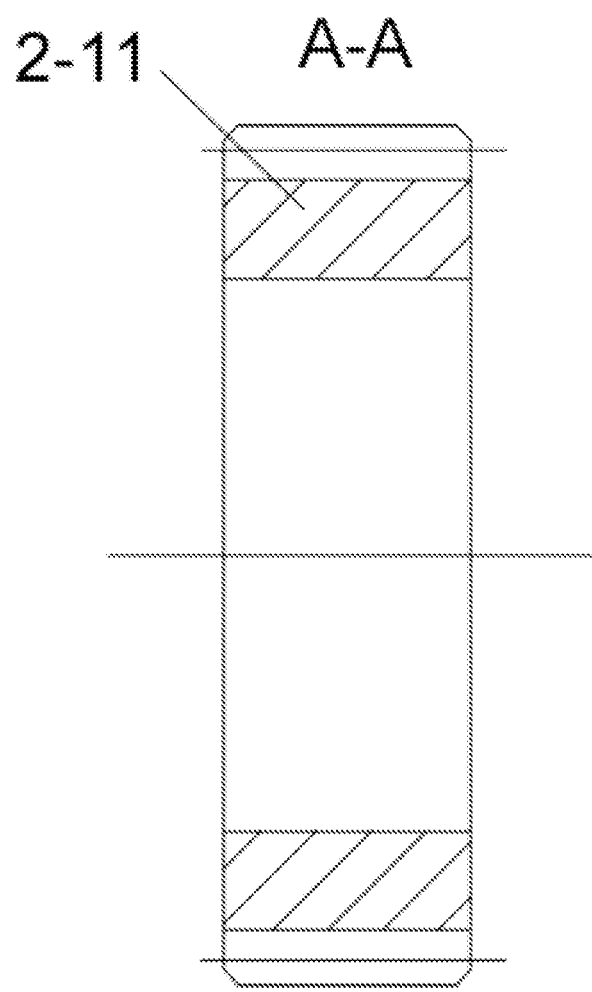
FIG. 27 is a sectional view along A-A in FIG. 26.
Figure 28:
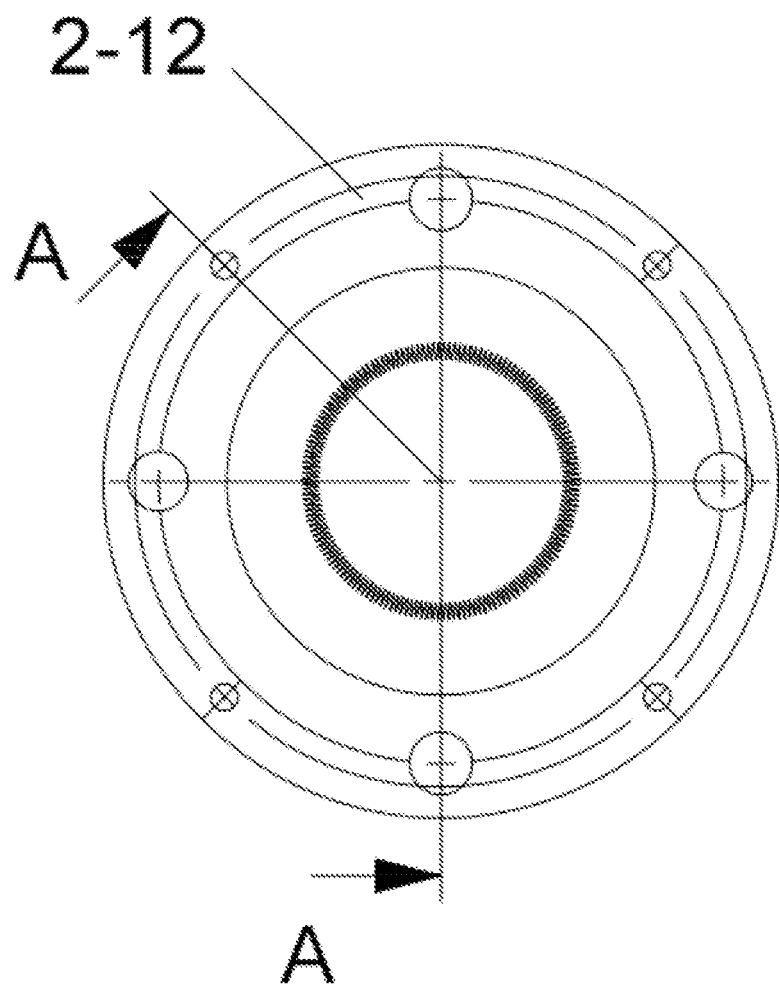
FIG. 28 is a front view of a second planet carrier in accordance with the present disclosure.
Figure 29:
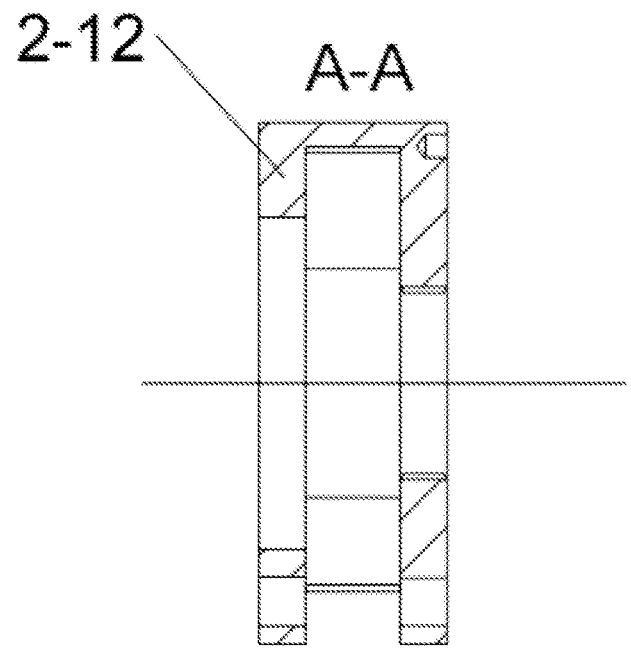
FIG. 29 is a sectional view along A-A in FIG. 28.
Figure 30:
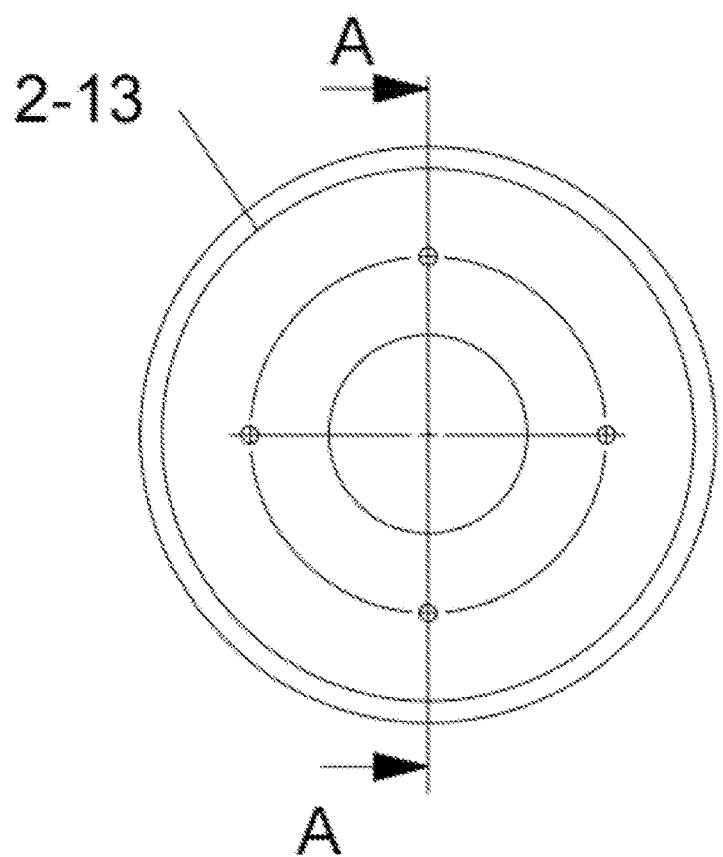
FIG. 30 is a front view of a second support in accordance with the present disclosure.
Figure 31:
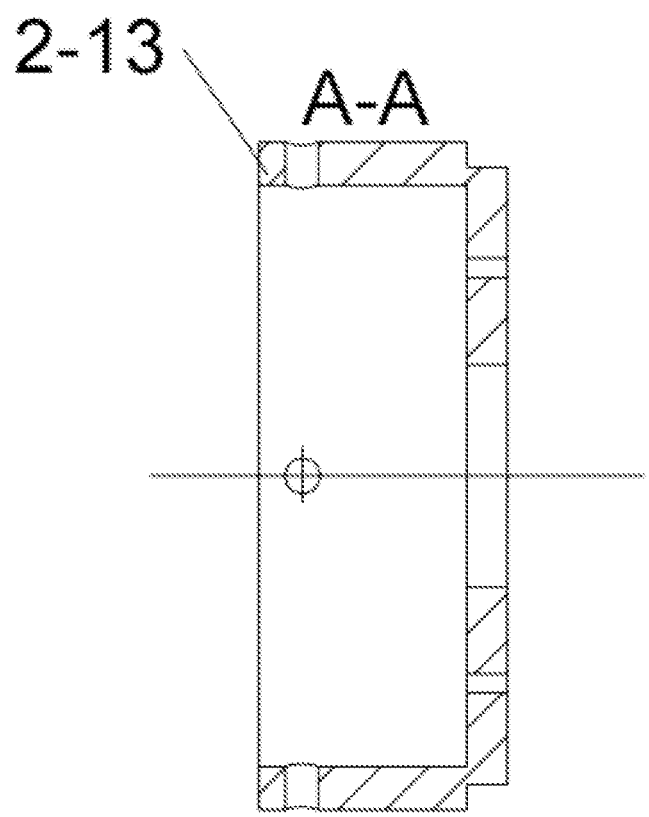
FIG. 31 is a sectional view along A-A in FIG. 30.
Figure 32:
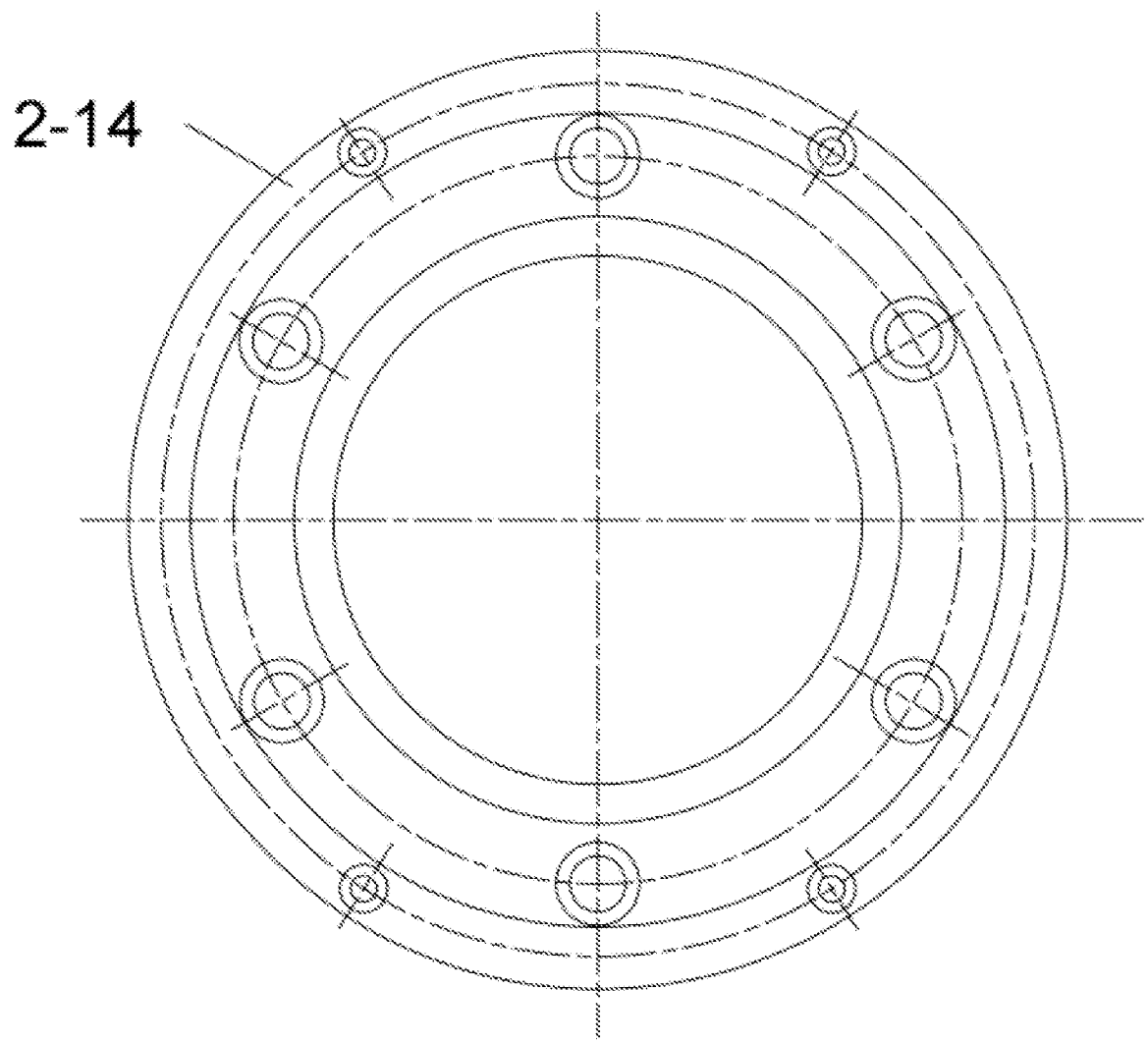
FIG. 32 is a front view of a first overrunning clutch in accordance with the present disclosure.
Figure 33:
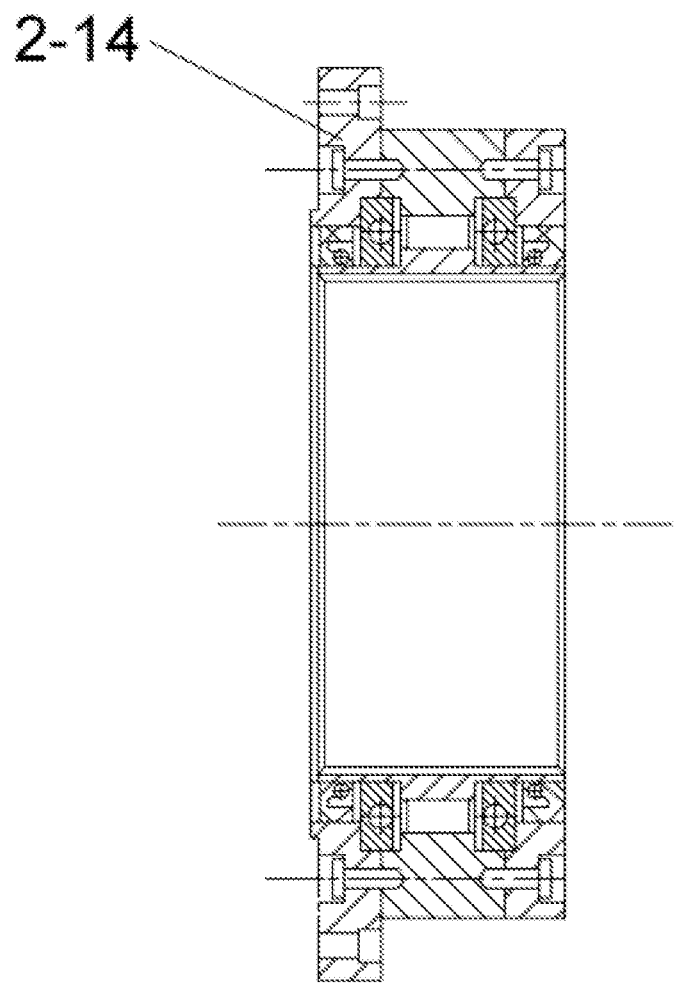
FIG. 33 is a left view (sectional view) of a first overrunning clutch in accordance with the present disclosure.
Figure 34:
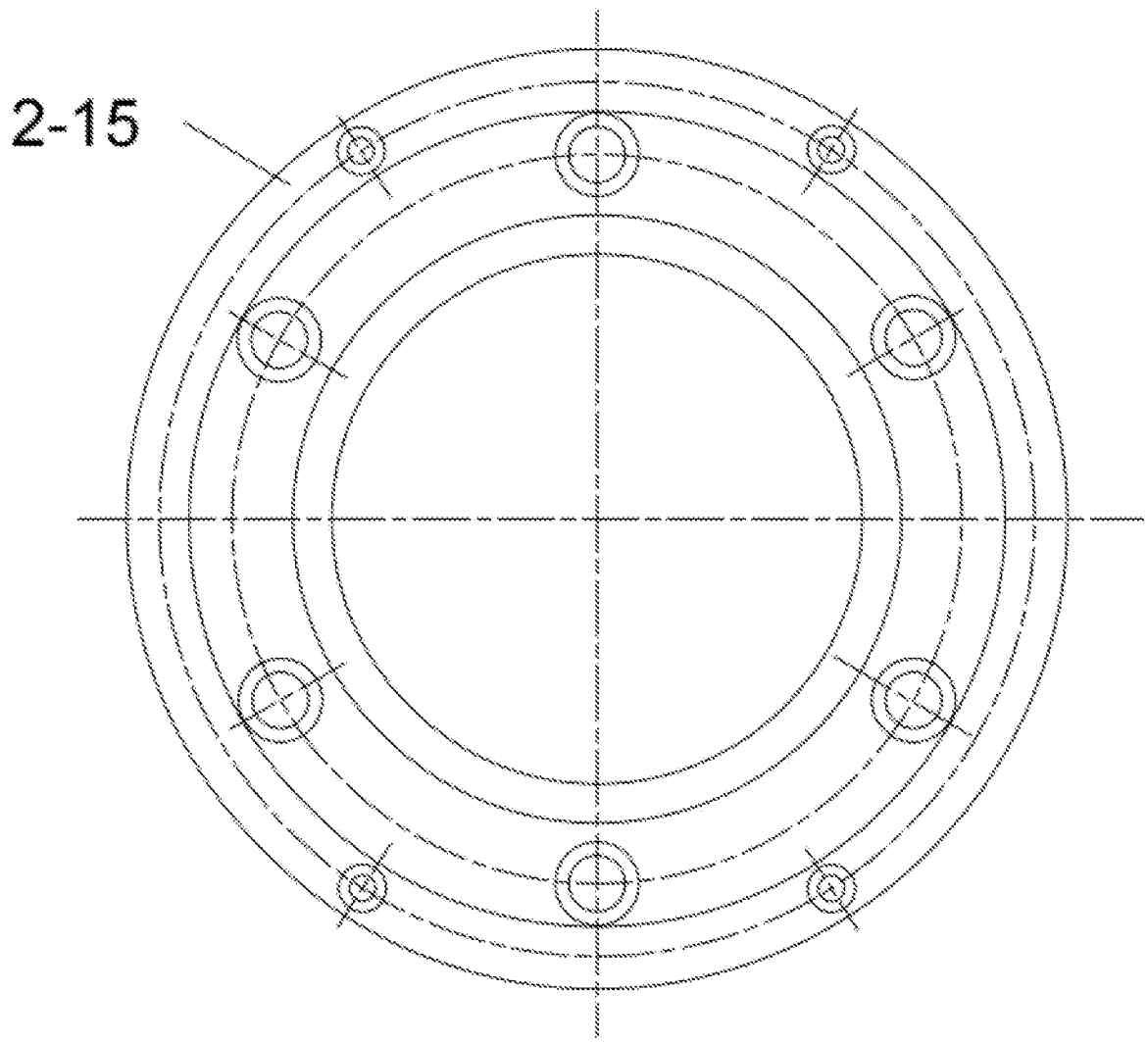
FIG. 34 is a front view of a second overrunning clutch in accordance with the present disclosure.
Figure 35:
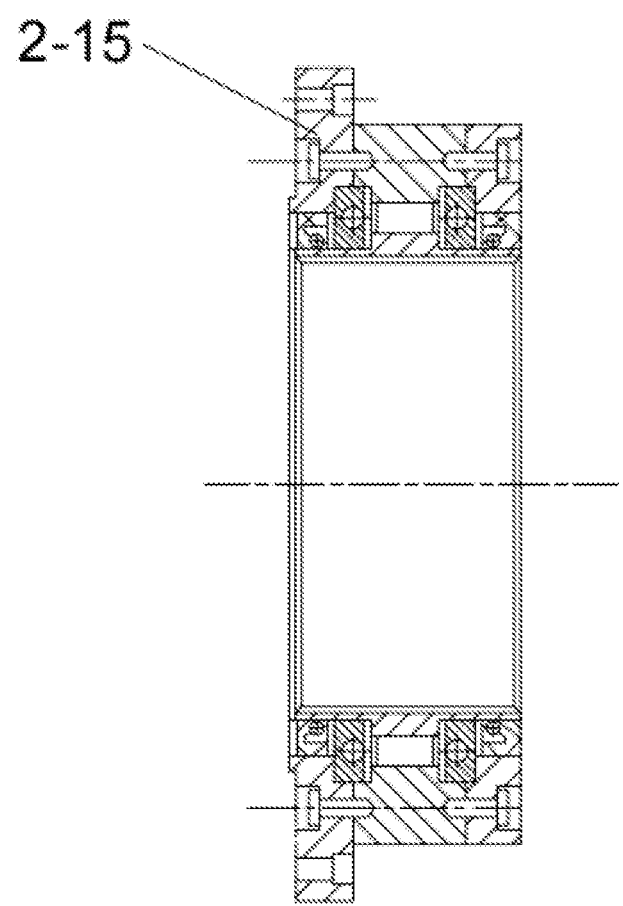
FIG. 35 is a left view (sectional view) of a second overrunning clutch in accordance with the present disclosure.
Figure 36:
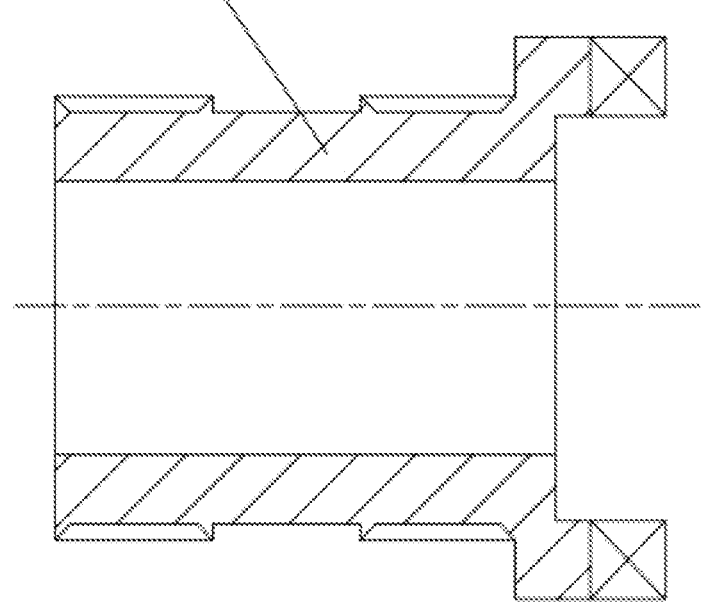
FIG. 36 is a structure diagram of a left clutch (of the clutch) in accordance with the present disclosure.
Figure 37:
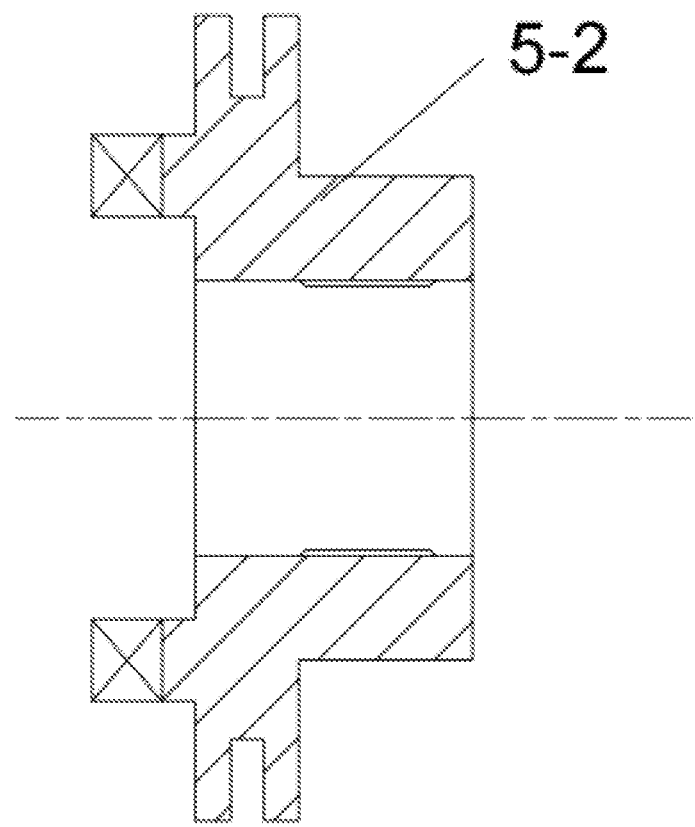
FIG. 37 is a structure diagram of a right clutch (of the clutch) in accordance with the present disclosure.

The following will describe the working principle of the differential in detail with reference to FIG. 2 and FIG. 3.

The rotational speed of the main differential satisfies an expression: $n_1+n_2=2n_0$.

The first planetary gear train differential controller unit has a speed ratio relationship as follows:

$$\frac{n_5 - n_H}{n_3 - n_H} = -\frac{z_3}{z_5},$$

setting that $$\alpha = \frac{z_3}{z_5},$$

due to the fact that a gear 3 is fixed to an axle housing and a gear 5 and a differential planet carrier are connected into a whole, $n_3=0$ and $n_5=n_0$, then $$n_H = \frac{1}{1+\alpha} \cdot n_o$$

The second planetary gear train differential controller unit has a speed ratio relationship as follows:

$$\frac{n_6 - n_H}{n_8 - n_H} = -\frac{z_8}{z_6},$$

setting that $$\beta = \frac{z_8}{z_6},$$

due to the fact that the planet carriers of the planetary gear trains of the two differential controllers are fixedly connected together, the rotational speeds are the same: a gear 8 is fixed to the axle housing, $n_8=0$, then $$n_6 = (1+\beta) \cdot n_H = \frac{1+\beta}{1+\alpha} \cdot n_o$$

Setting that the maximum limit differential ratio of $n_1$ to $n_2$ with respect to n % at the minimum turning radius is k, then:

$n_{min}=n_H=(1-k)\cdot n_0$, at this time, the rotational speed is consistent with the rotational speed of the outer ring of the first overrunning clutch;

$n_{max}=n_6=(1+k)\cdot n_0$, at this time, the rotational speed is consistent with the rotational speed of the outer ring of the second overrunning clutch;

$$k = \frac{\alpha}{1+\alpha}, \ \beta = 2\alpha;$$

or $$\alpha = \frac{k}{1-k}, \beta = \frac{2k}{1-k},$$

The vehicle has the maximum differential speed between the left and the right at the minimum turning radius. To describe the problem conveniently, assuming that a certain model k=30%, then $n_{min}=0.7n_0$, $n_{max}=1.3n_0$.

When the automobile goes straight, $n_1=n_2=n_0$, $n_H=0.7n_0$, $n_6=1.3n_0$. As the planet carriers H of the first and second planetary gear train differential controller units and the outer ring of the first overrunning clutch are connected into a whole and the rotational speed $n_H$ is less than the rotational speed $n_2$ of the inner ring of the first overrunning clutch connected to the right axle shaft, the first overrunning clutch is in an overrunning disengaged state. As an inner sun gear 6 of the second planetary gear train differential controller unit and the outer ring of the second overrunning clutch are connected together and the rotational speed $n_6$ of the outer ring is greater than the rotational speed $n_2$ of the inner ring connected to the right axle shaft, the second overrunning clutch is also in an overrunning disengaged state, and the automobile runs normally.

When the automobile turns left at a radius greater than or equal to the minimum turning radius, $n_1 \geq 0.7n_0$, $n_2 \leq 1.3n_0$, at the moment, the rotational speed $n_H=0.7n_0$ of the outer ring of the first overrunning clutch of the first planetary gear train differential controller unit is less than or equal to the rotational speed $n_2$ of the inner ring of the first overrunning clutch, the first overrunning clutch is in an overrunning disengaged state or the inner ring and the outer ring rotate at the same rotational speed without affecting the rotational speed $n_2$ of the right axle shaft. Meanwhile, the rotational speed $n_6=1.3n_0$ of the outer ring of the second overrunning clutch of the second planetary gear train differential controller unit is greater than or equal to the rotational speed $n_2$ of the inner ring, the second overrunning clutch is also in an overrunning disengaged state or the inner ring and the outer ring rotate at the same rotational speed without affecting the rotational speed $n_2$ of the right axle shaft, and thus the automobile turns left at the normal differential speed.

When the automobile turns right at the radius greater than or equal to the minimum turning radius, $n_1 \leq 1.3n_0$, $n_2 \geq 0.7n_0$, at the moment, the rotational speed $n_H=0.7n_0$ of the outer ring of the first overrunning clutch of the first planetary gear train differential controller unit is less than or equal to the rotational speed $n_2$ of the inner ring of the first overrunning clutch, the first overrunning clutch is in an overrunning disengaged state or the inner ring and the outer ring rotate at the same rotational speed without affecting rotational speed $n_2$ of the right axle shaft. Meanwhile, the rotational speed $n_6=1.3n_0$ of the outer ring of the second overrunning clutch of the second planetary gear train differential controller unit is greater than or equal to the rotational speed $n_2$ of the inner ring, the second overrunning clutch is also in an overrunning disengaged state or the inner ring and the outer ring rotate at the same rotational speed without affecting the rotational speed $n_2$ of the right axle shaft, and thus the automobile turns right at the normal differential speed.

In a case that the left wheel 1 of the automobile slips and exceeds the normal differential speed range, that is, when $n_1 > 1.3n_0$, it is inevitably that $n_2 < 0.7n_0$ as $n_2+n_2=2n_0$. At the moment, the rotational speed $n_H=0.7n_0$ of the outer ring of the first overrunning clutch of the first planetary gear train differential controller unit is greater than the rotational speed $n_2$ of the inner ring, the first overrunning clutch is in a wedging state, and the rotational speed $n_2$ of the right axle shaft cannot be lower than the rotational speed $n_H=0.7n_0$, and the continuous increase of the rotational speed of the $n_1$ is limited, thus achieving the purpose of limited slip and guaranteeing the normal running and passing of the vehicle. Meanwhile, the rotational speed $n_b=1.3n_a$ of the outer ring of the second overrunning clutch of the second planetary gear train differential controller unit is greater than the rotational speed $n_2$ of the inner ring, the second overrunning clutch is in an overrunning disengaged state without affecting the rotational speed $n_2$ of the right axle shaft.

In a case that the right wheel 2 of the automobile slips, when $n_2 > 1.3n_0$, the rotational speed $n_H=0.7n_0$ of the outer ring of the first overrunning clutch of the first planetary gear train differential controller unit is less than the rotational speed $n_2$ of the inner ring, the first overrunning clutch is in an overrunning disengaged state without affecting the rotational speed of the right axle shaft. Meanwhile, the rotational speed $n_6=1.3n_a$ of the outer ring of the second overrunning clutch of the second planetary gear train differential controller unit is less than the rotational speed $n_2$ of the inner ring, the second overrunning clutch is in a wedging state, the continuous increase of the rotational speed $n_2$ of the right axle shaft is limited, thus achieving the purpose of limited slip and guaranteeing the normal running and passing of the vehicle.

In conclusion, whether the left and right wheels are in straight running, in the minimum left turning radius and the minimum right turning radius, or in the slipping state, the planetary gear train differential controller not only can meet the maximum differential speed requirements of the minimum turning radii of the left wheel and the right wheel, but also can perform automatic limited slip in time when the vehicle is about to exceed the normal differential speed and slip occurs, thereby guaranteeing the normal running and passing of the vehicle.

Further, the change curves of the rotational speeds of the left wheel and the right wheel are as shown in FIG. 3. As can be seen from FIG. 3, when the rotational speeds of the wheels are within the set upper and lower limit threshold range from $(1-k) n_0$ to $(1+k) n_0$, the normal differential speed between the wheels meets the minimum turning radius requirement. When the wheel slip exceeds the upper and lower limit threshold range, the first overrunning clutch and the second overrunning clutch may limit the rotational speed $n_H \leq n_2 \leq n_6$ of the right wheel, or $(1-k) n_0 \leq n_2 \leq (1+k) n_0$, thereby achieving the purpose of limited slip and enabling the vehicle to automatically prevent skidding, get out of trouble in time, and run and pass normally.

What is claimed is:

1. A planetary gear train automatic limited slip differential, consisting of a main differential, a planetary gear train differential controller, a left axle shaft, a right axle shaft, and a clutch;
    wherein the planetary gear train differential controller is composed of a first planetary gear train differential controller unit and a second planetary gear train differential controller unit;
    the first planetary gear train differential controller unit being composed of a first planetary gear train and a first overrunning clutch connected to the first planetary gear train, and the second planetary gear train differential controller unit being composed of a second planetary gear train and a second overrunning clutch connected to the second planetary gear train;
    the planetary gear train differential controller being arranged at the right axle shaft at the right side of the main differential;
    the clutch being composed of a left clutch and a right clutch, and the left clutch and the right clutch are coupled together by jaws or disengaged from each other;
    an inner ring of each of the first overrunning clutch and the second overrunning clutch and the left clutch being connected into a whole by splines, and the right clutch and the right axle shaft are connected together by a spline;
    wherein the first planetary gear train differential controller unit is configured to control a rotational speed of a right wheel to be not lower than a set minimum rotational speed $n_{min}$, and the second planetary differential controller unit is configured to control a rotational speed of the right wheel to be not higher than a set maximum rotational speed $n_{max}$;

the first planetary gear train including a first support, a first large sun gear, a first planetary gear, a first small sun gear, and a first planet carrier;

the second planetary gear train including a second support, a second large sun gear, a second planetary gear, a second small sun gear, and a second planet carrier;

wherein the first large sun gear and the first support are connected together by a bolt;

wherein the first support is connected to a main differential mechanism housing by a bolt;

wherein the first small sun gear is fixed to an axle housing by a bolt;

wherein the first planet carrier and the second planet carrier are connected into a whole by a spline hollow shaft;

wherein the second planet carrier and an outer ring of the first overrunning clutch are connected into a whole by a bolt;

wherein the inner ring of the first overrunning clutch and an input end of the clutch are connected together by a spline so as to control the rotational speed of the right wheel to be not lower than the set minimum rotational speed $n_{min}$;

wherein the second small sun gear is fixed to the axle housing by a bolt;

wherein the second large sun gear and the second support are connected together by a bolt;

wherein the second support and an outer ring of the second overrunning clutch are connected into a whole by a bolt; and wherein the inner ring of the second overrunning clutch and the input end of the clutch are connected together by a spline so as to control the rotational speed of the right wheel to be not higher than the set maximum rotational speed $n_{max}$.

2. The planetary gear train automatic limited slip differential according to claim 1, wherein the clutch is arranged at the outside of the second overrunning clutch;

wherein the left clutch is used as the input end of the clutch for controlling the rotational speed;

wherein the right clutch is used as the output end of the clutch for controlling the rotational speed; and wherein, during reversing, the left clutch and the right clutch are separated from each other, and are disengaged from the planetary gear train differential controller.

* * * * *